United States Patent
Kahn et al.

(10) Patent No.: US 11,532,985 B2
(45) Date of Patent: *Dec. 20, 2022

(54) SWITCHING CIRCUITS HAVING MULTIPLE OPERATING MODES AND ASSOCIATED METHODS

(71) Applicant: Maxim Integrated Products, Inc., San Jose, CA (US)

(72) Inventors: Seth M. Kahn, San Francisco, CA (US); Anthony J. Stratakos, Kentfield, CA (US); Ilija Jergovic, Palo Alto, CA (US); Vincent W. Ng, Milpitas, CA (US); Ryan James Ricchiuti, Oakland, CA (US); Artin Der Minassians, Oakland, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/504,582

(22) Filed: Jul. 8, 2019

(65) Prior Publication Data

US 2019/0386490 A1 Dec. 19, 2019

Related U.S. Application Data

(63) Continuation of application No. 15/209,154, filed on Jul. 13, 2016, now Pat. No. 10,348,095.

(Continued)

(51) Int. Cl.
*H01H 47/00* (2006.01)
*H02M 3/158* (2006.01)
(Continued)

(52) U.S. Cl.
CPC .......... *H02M 3/1584* (2013.01); *H02J 1/102* (2013.01); *H02J 3/381* (2013.01); *H02J 2300/26* (2020.01); *H02M 1/0077* (2021.05); *Y02E 10/56* (2013.01)

(58) Field of Classification Search
CPC .. H02J 3/385; H02J 3/383; H02J 1/102; H02J 3/14; H02J 3/381; H02J 2300/26;
(Continued)

(56) References Cited

U.S. PATENT DOCUMENTS 7,719,140 B2   5/2010   Ledenev et al.
8,274,172 B2   9/2012   Hadar et al.
(Continued)

FOREIGN PATENT DOCUMENTS

CN   102884488 A   1/2013
WO   2011019936 A1   2/2011

OTHER PUBLICATIONS

PCT/U2016/042080 International Search Report & Written Opinion, dated Oct. 20, 2016, 7 pages.
(Continued)

*Primary Examiner* — Rexford N Barnie
*Assistant Examiner* — Rasem Mourad
(74) *Attorney, Agent, or Firm* — Lathrop GPM LLP

(57) ABSTRACT

A method for controlling a switching circuit including an input port electrically coupled to a photovoltaic device and an output port electrically coupled to a load includes (1) entering a voltage limiting operating mode and (2) in the voltage limiting operating mode (i) causing a control switching device of the switching circuit to repeatedly switch between its conductive and non-conductive states in a manner which limits magnitude of an output voltage to a maximum voltage value, the output voltage being a voltage across the output port, and (ii) varying the maximum voltage
(Continued)

value as a function of magnitude of an output current, the output current being a current flowing through the output port.

7 Claims, 33 Drawing Sheets

Related U.S. Application Data

(60) Provisional application No. 62/330,991, filed on May 3, 2016, provisional application No. 62/191,936, filed on Jul. 13, 2015.

(51) Int. Cl.
*H02J 1/10* (2006.01)
*H02J 3/38* (2006.01)
*H02M 1/00* (2006.01)

(58) Field of Classification Search
CPC .............. H02J 2300/24; H02M 3/1584; H02M 2001/0077; Y02E 10/56; H02S 40/30–38
See application file for complete search history.

(56) References Cited

U.S. PATENT DOCUMENTS

| | | |
|---|---|---|
| 8,872,384 B2 | 10/2014 | Stratakos et al. |
| 2010/0207455 A1 | 8/2010 | Erickson et al. |
| 2010/0301991 A1 | 12/2010 | Sella et al. |
| 2010/0327659 A1 | 12/2010 | Lisi et al. |
| 2011/0067750 A1 | 3/2011 | Ueda |
| 2011/0172842 A1* | 7/2011 | Makhota ................ H02J 3/383 700/292 |
| 2012/0043818 A1* | 2/2012 | Stratakos ............. H03K 17/145 307/77 |
| 2012/0326512 A1 | 12/2012 | Masayuki et al. |
| 2014/0103891 A1 | 4/2014 | Stratakos et al. |
| 2014/0103892 A1* | 4/2014 | McJimsey ............... H02J 3/381 323/271 |
| 2014/0103894 A1* | 4/2014 | McJimsey .............. G01R 21/06 323/282 |
| 2015/0381108 A1 | 12/2015 | Hoft et al. |
| 2016/0006392 A1 | 1/2016 | Hoft |
| 2016/0028325 A1* | 1/2016 | Redmann .......... H02M 7/53871 363/98 |

OTHER PUBLICATIONS

English Abstract RU 2313169 C2, published Dec. 20, 2007, Federa'Noe Gosudarstvennoe Unitarnoe Predprijatie "Nauchno-Proizvodstvennoe OB Edinenie Prikladnojmekhaniki IM. Akad. M.F. Reshetneva", 1 page.

Chinese Patent Application No. 201680052305.4, English translation of Office Action dated Jun. 21, 2019, 12 pages.

Chinese Patent Application No. 201680052184.3; First Office Action dated Jun. 2, 2021; 23 pgs.

Chinese Patent Application No. 201680052184.3; Second Office Action dated Mar. 3, 2022; 10 pgs.

Chinese Patent Application No. 201680052184.3; English Translation of Second Office Action dated Mar. 3, 2022; 10 pgs.

\* cited by examiner

SWITCHING CIRCUITS HAVING MULTIPLE OPERATING MODES AND ASSOCIATED METHODS

RELATED APPLICATIONS

This application is a continuation of U.S. patent application Ser. No. 15/209,154, filed on Jul. 13, 2016, which claims benefit of priority to (a) U.S. Provisional Patent Application Ser. No. 62/191,936, filed Jul. 13, 2015, and (b) U.S. Provisional Patent Application Ser. No. 62/330,991, filed May 3, 2016. Each of the afore-mentioned applications is incorporated herein by reference.

BACKGROUND

Photovoltaic cells are often used to recharge batteries, or to provide power to an electric grid and/or a building through an inverter. Photovoltaic cells often, however, provide less output power than expected from known device efficiency and illumination.

One reason that photovoltaic cells may deliver less than optimum power is that their maximum power output under typical conditions is often at a voltage that is not well matched to their load. This mismatch occurs, in part, because typical photovoltaic cells are temperature sensitive, and a sufficient quantity of photovoltaic cells must be connected in series to provide required voltage magnitude at high temperatures. This large photovoltaic cell count becomes excessive at low temperatures where photovoltaic cells' maximum power output voltage is highest. Similarly, maximum power output voltage may change with illumination changes. Other losses occur when any one series-connected photovoltaic cell in a module of interconnected photovoltaic cells ("photovoltaic module") generates less current than other photovoltaic cells in the photovoltaic module. Barring additional circuitry, the output current of a series string of photovoltaic cells is effectively limited by photocurrent produced in the weakest, or most shaded, cell.

Since shading affects photocurrent produced in photovoltaic cells, often limiting current production of a series string of cells to that of a most-shaded cell of the string, un-shaded cells in the same series string may yield substantially less power than they are otherwise capable of. Further, shading of cells may vary with time of day, sun angle, obstruction position, and even the position of wind-blown leaves or other debris on a photovoltaic panel.

Maximum Power Point Tracking (MPPT) controllers are frequently connected between a photovoltaic module and a load, such as an inverter or a battery. MPPT controllers typically include a switching circuit, such as a buck DC-to-DC converter, that converts an input power at a module voltage to an output power for the load at a load voltage, and control circuitry that seeks to find a module voltage at which the photovoltaic module produces maximum power. The switching circuit of the MPPT controller serves to decouple the photovoltaic module and load voltages.

Parallel connection of photovoltaic modules in a photovoltaic system can result in reverse current flowing through portions of the system. For example, FIG. 1 illustrates a prior art photovoltaic electric power system 100 including three parallel-coupled strings 102, where each string 102 includes a plurality of MPPT controllers 104 with output ports 106 electrically coupled in series. A respective photovoltaic module 108 is electrically coupled to each controller 104's input port 110. In this document, specific instances of an item may be referred to by use of a numeral in parentheses (e.g., string 102(1)) while numerals without parentheses refer to any such item (e.g., strings 102).

Although the parallel-coupling of strings 102 in system 100 forces each string 102 to have a common voltage, strings 102 may have different inherent voltages. For example, strings 102 may receive unequal illumination, operate at different temperatures, and/or include differing numbers or types of photovoltaic modules 108 and associated MPPT controllers 104, causing strings 102 to operate at different inherent voltages. As another example, one string 102 may be intentionally disabled while another string 102 is enabled, such that the disabled string 102 has a lower inherent voltage than the enabled string 102. As yet another example, one string 102 may shut down more quickly than another string 102 during deactivation of system 100, or one string 102 may power up more quickly than another string 102 during activation of system 100, such that at least two strings 102 temporarily have different inherent voltages.

Mismatch in inherent electrical characteristics among strings 102 may lead to reverse current through some strings 102. For example, consider a scenario where string 102(1) has a higher maximum power point voltage than the open-circuit voltage of string 102(2) or 102(3), such that string 102(1) is considered a "strong" string and strings 102(2) and 102(3) are considered "weak" strings. The parallel-coupling of strong string 102(1) with weak strings 102(2) and 102(3) may cause weak strings 102(2) and 102(3) to operate in their negative current regimes, such that forward current 112 flows through strong string 102(1) and reverse currents 114, 116 flow through one or both of weak strings 102(2) and 102(3). If strings 102(2), 102(3) have different current-voltage characteristics, reverse currents 114, 116 will have different magnitudes, such that strings 102(2), 102(3) do not equally share reverse current. Such reverse current imbalance can be large due to the current-voltage characteristics of photovoltaic cells within photovoltaic modules 108, resulting in excessive power loss and system reliability issues. Accordingly, strings 102 sometimes include blocking diodes 118 to prevent flow of reverse current through the strings.

A photovoltaic module is typically capable of producing energy whenever it is exposed to light. This continuous availability of energy can present a safety hazard, such as during photovoltaic system installation, inspection, or maintenance. Additionally, it may be desirable to limit availability of energy from a photovoltaic module during a fault condition, or during an emergency situation, such as during a fire.

SUMMARY

In an embodiment, a method for controlling a switching circuit including an input port electrically coupled to a photovoltaic device and an output port electrically coupled to a load includes the following steps: (1) entering a voltage limiting operating mode, and (2) in the voltage limiting operating mode: (i) causing a control switching device of the switching circuit to repeatedly switch between its conductive and non-conductive states in a manner which limits magnitude of an output voltage to a maximum voltage value, the output voltage being a voltage across the output port, and (ii) varying the maximum voltage value as a function of magnitude of an output current, the output current being a current flowing through the output port.

In an embodiment, a method for controlling a switching circuit including an input port electrically coupled to a photovoltaic device and an output port electrically coupled to a load includes the following steps: (1) in a first operating mode of the switching circuit, causing a control switching device of the switching circuit to repeatedly switch between its conductive and non-conductive states to transfer power from the photovoltaic device to the load, (2) determining, at the switching circuit, that an operating mode change is appropriate, based at least in part on one or more of magnitude of an output current, polarity of the output current, and magnitude of an output voltage, the output voltage being a voltage across the output port, and the output current being a current flowing through the output port, and (3) in response to determining that the operating mode change is appropriate, switching operating mode of the switching circuit from the first operating mode to a second operating mode, the second operating mode being different from the first operating mode.

In an embodiment, a method for controlling a switching circuit including an input port electrically coupled to a photovoltaic device and an output port electrically coupled to a load includes the following steps: (1) entering a current limiting operating mode, and (2) in the current limiting operating mode, (a) causing a control switching device of the switching circuit to repeatedly switch between its conductive and non-conductive states in a manner which limits magnitude of an output current to a maximum current value, the output current being a current flowing through the output port, and (b) varying the maximum current value as a function of magnitude of an output voltage, the output voltage being a voltage across the output port.

In an embodiment, a method for controlling an operating mode control device including an input port electrically coupled to a photovoltaic device and an output port electrically coupled to a load includes the following steps: (1) in a first operating mode of the operating mode control device, transferring power from the photovoltaic device to the load, (2) shunting current flowing through the output port around the photovoltaic device using a switching device electrically coupled across the output port, when an output current exceeds a short circuit current of the photovoltaic device, the output current being current flowing through the output port, (3) switching operating mode of the operating mode control device from the first operating mode to a disable operating mode, and (4) causing the switching device to continuously operate in its conductive state, in the disable operating mode.

In an embodiment, a switching circuit having multiple operating modes includes an input port for electrically coupling to an energy producing device and an output port for electrically coupling to a load, a control switching device electrically coupled between the input port and the output port, and a control module. The control module includes (1) an operating mode submodule configured to enter a voltage limiting operating mode of the switching circuit, (2) a switching control submodule configured to control switching of the control switching device, and (3) a voltage limiting submodule. The voltage limiting submodule is configured to, in the voltage limiting operating mode, (a) command the switching control submodule to cause the control switching device to repeatedly switch between its conductive and non-conductive states in a manner which limits magnitude of the output voltage to a maximum voltage value, the output voltage being a voltage across the output port, and (b) vary the maximum voltage value as a function of magnitude of an output current, the output current being a current flowing through the output port.

In an embodiment, a switching circuit having multiple operating modes includes an input port for electrically coupling to an energy producing device, an output port for electrically coupling to a load, a control switching device electrically coupled between the input port and the output port, and a control module. The control module includes (1) a switching control submodule configured to control switching of the control switching device such that in a first operating mode of the switching circuit, the control switching device repeatedly switches between its conductive and non-conductive states to transfer power from the energy producing device to the load and (2) an operating mode submodule. The operating mode submodule is configured to (a) determine, at the switching circuit, that an operating mode change is appropriate, based at least in part on one or more of magnitude of an output current, polarity of the output current, and magnitude of an output voltage, the output voltage being a voltage across the output port, and the output current being a current flowing through the output port, and (b) in in response to determining that the operating mode change is appropriate, switch operating mode of the switching circuit from the first operating mode to a second operating mode, the second operating mode being different from the first operating mode.

In an embodiment, a switching circuit having multiple operating modes includes an input port for electrically coupling to an energy producing device, an output port for electrically coupling to a load, a control switching device electrically coupled between the input port and the output port, and a control module. The control module includes: (1) an operating mode submodule configured to enter a current limiting operating mode of the switching circuit, (2) a switching control submodule configured to control switching of the control switching device, and (3) a current limiting submodule configured to, in the current limiting operating mode, (a) command the switching control submodule to cause the control switching device to repeatedly switch between its conductive and non-conductive states in a manner which limits magnitude of an output current to a maximum current value, the output current being a current flowing through the output port, and (b) vary the maximum current value as a function of magnitude of an output voltage, the output voltage being a voltage across the output port.

In an embodiment, an operating mode control device includes an input port for electrically coupling to a photovoltaic device, an output port for electrically coupling to a load, a switching device electrically coupled across the output port, and a control module. The control module is configured to (1) cause the switching device to operate in its conductive state to shunt current flowing through the output port around the photovoltaic device, when an output current exceeds a short circuit current of photovoltaic device, the output current being current flowing through the output port, (2) cause the operating mode control device to enter a disable operating mode, and (3) cause the switching device to continuously operate in its conductive state, in the disable operating mode.

DETAILED DESCRIPTION OF THE EMBODIMENTS

Applicant has developed switching circuits and associated methods which significantly advance the state of the art of power extraction from energy producing devices. These switching circuits have multiple operating modes including, for example, an MPPT operating mode, a current limiting operating mode, a voltage limiting operating mode, a reverse current operating mode, and/or a disable operating mode. As discussed below, these operating modes may advantageously promote safety, reliability, efficiency, low cost, and/or minimal reverse current magnitude.

Figure 1:
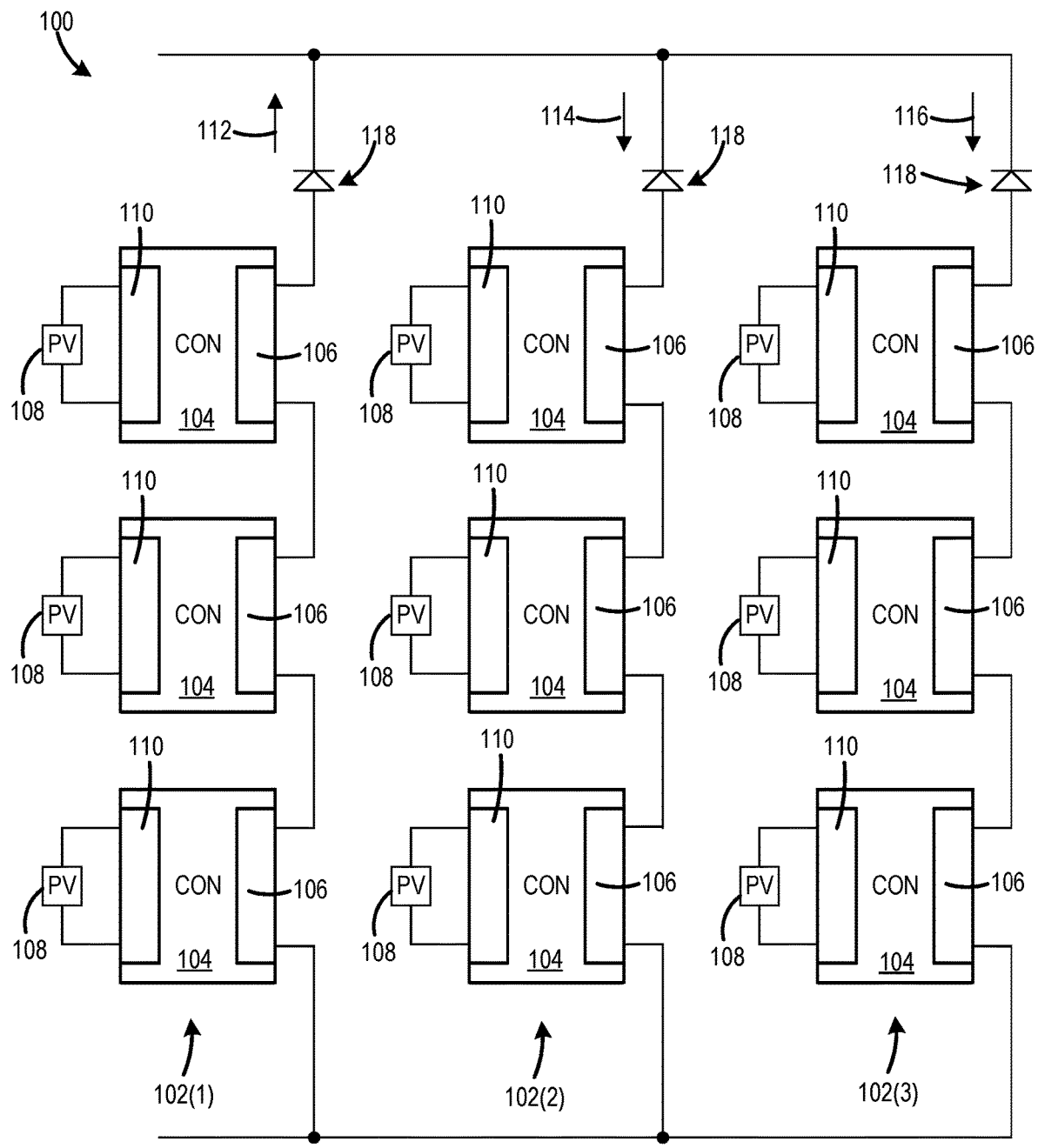
FIG. 1 illustrates a prior-art photovoltaic electric power system including three parallel-coupled strings.
Figure 2:
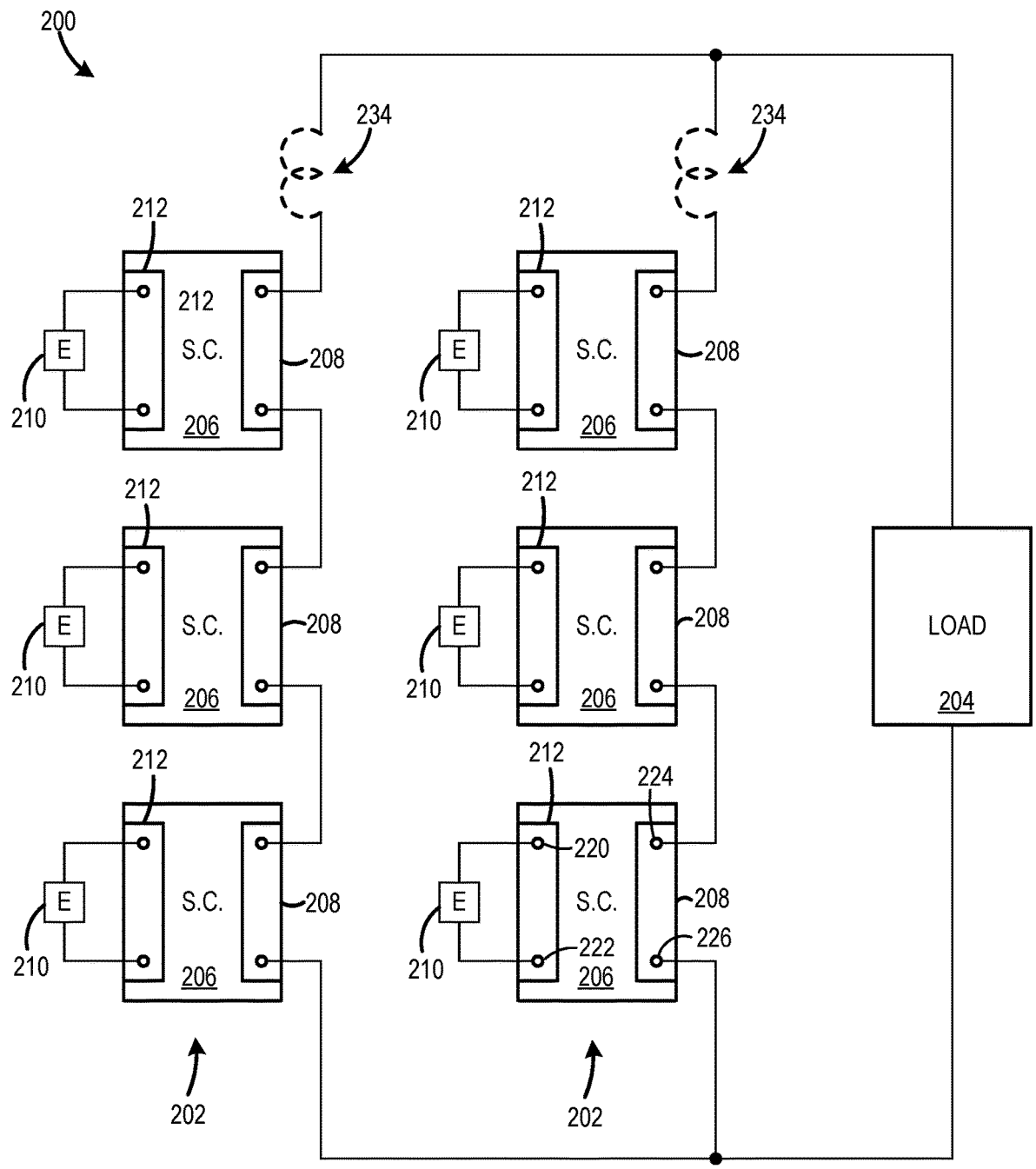
FIG. 2 illustrates an electric power system including two parallel-coupled strings, according to an embodiment.

FIG. 2 illustrates an electric power system 200 including two parallel-coupled strings 202 electrically coupled to a load 204, such as an inverter, battery charger, or a DC-to-DC converter. In certain alternate embodiments, load 204 is replaced with, or supplemented by, another energy producing device, such as a battery or a generator. Each string 202 includes a plurality of switching circuits 206 with output ports 208 electrically coupled in series, such that each output port 208 is electrically coupled to load 204. A respective energy producing device 210 is electrically coupled to each switching circuit 206's input port 212. Energy producing devices 210 are, for example, photovoltaic devices, fuel cells, wind turbines, or one or more batteries. The term "photovoltaic device" in this document means one or more electrically-coupled photovoltaic cells, such as a single-junction photovoltaic cell, a multijunction photovoltaic cell, a photovoltaic module of interconnected photovoltaic cells, or a panel of multiple interconnected photovoltaic modules. The number of switching circuits 206, as well as the number of parallel-coupled strings 202, may be varied without departing from the scope hereof. For example, in one particular alternate embodiment, electric power system 200 includes only a single string 202.

Figure 3:
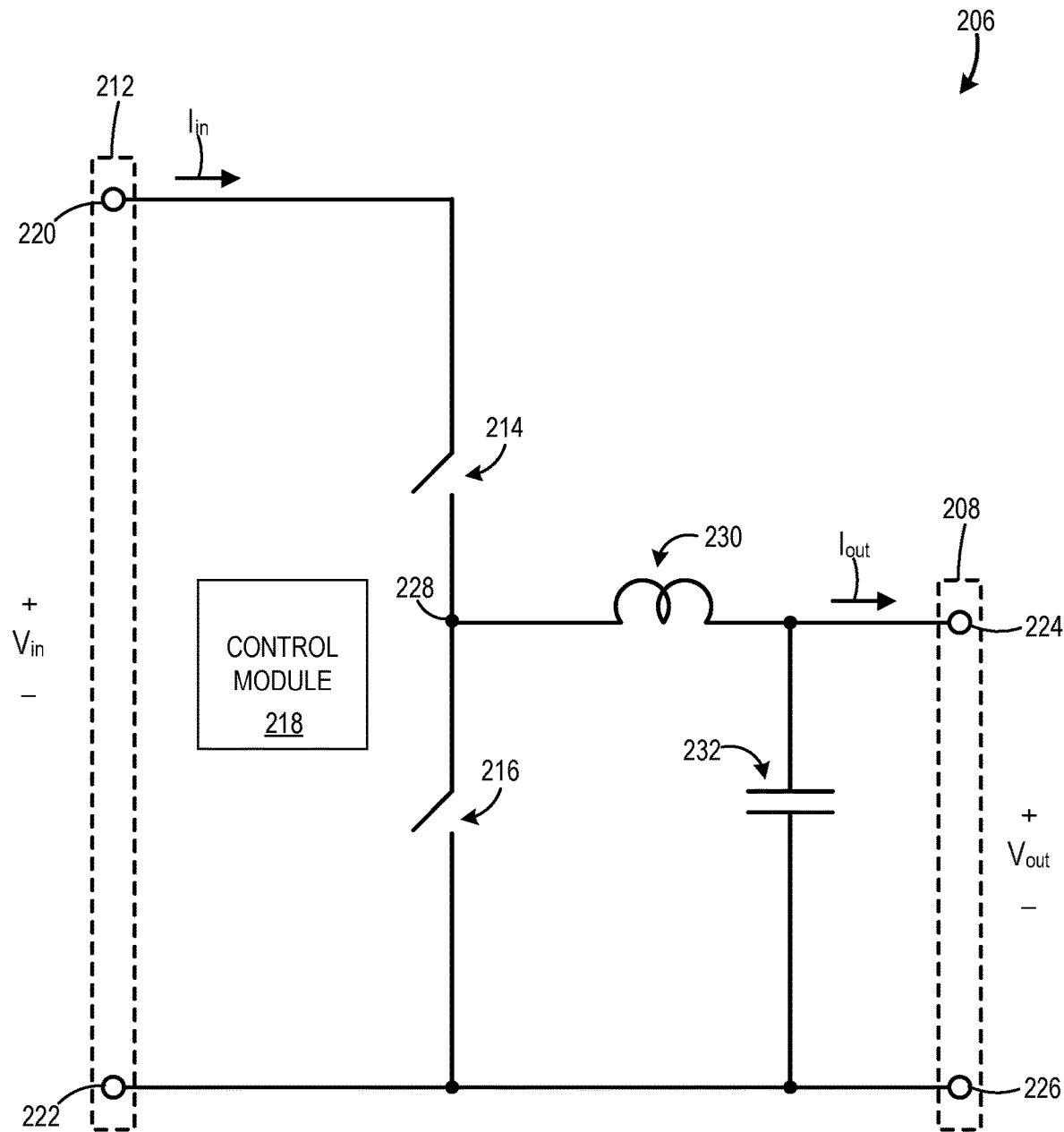
FIG. 3 illustrates one instance of a switching circuit of the FIG. 2 electric power system, according to an embodiment.

FIG. 3 illustrates one instance of switching circuit 206. Each switching circuit 206 includes an input port 212, an output port 208, a control switching device 214, a freewheeling switching device 216, and a control module 218. Input port 212 includes a positive input terminal 220 and a negative input terminal 222, and output port 208 includes a positive output terminal 224 and a negative output terminal 226. A respective energy producing device 210 is electrically coupled across positive input terminal 220 and negative input terminal 222. Other switching circuit 206 instances and load 204 are electrically coupled to positive output terminal 224 and negative output terminal 226. Only one instance of each of positive input terminal 220, negative input terminal 222, positive output terminal 224, and negative output terminal 226 are labeled in FIG. 2 to promote illustrative clarity. Control switching device 214 is electrically coupled between positive input terminal 220 and a switching node 228, and freewheeling switching device 216 is electrically coupled between switching node 228 and each of negative input terminal 222 and negative output terminal 226. In the context of this document, the term "switching device" refers to a device which can be controlled to switch between conductive and non-conductive states, including, but not limited to, one or more field effect transistors, bipolar junction transistors, and/or insulated gate bipolar transistors.

Switching circuit 206 optionally further includes an inductor 230 electrically coupled between switching node 228 and positive output terminal 224, as well as a capacitor 232 electrically coupled between positive output terminal 224 and negative output terminal 226, as illustrated. Switching circuit 206 optionally further includes an input capacitor (not shown) electrically coupled between positive input terminal 220 and negative input terminal 222. In embodiments where inductor 230 is omitted, capacitor 232 is also omitted, and positive output terminal 224 is directly electrically coupled to switching node 228. Some embodiments of electric power system 200 further include an inductor 234 electrically coupled in series with each string 202, in place of, or in addition to, inductors 230 in switching circuits 206. Use of inductors 234 in place of inductors 230 may significantly reduce the number of inductors in system 200 because only one inductor 234 is required per string 202, thereby promoting low system cost, small system size, and system simplicity. Furthermore, in some embodiments, inductors 234 are interconnection inductance of circuits electrically coupling output ports 208 and load 204, instead of explicit inductors. Such interconnection inductance is sometimes referred to as parasitic inductance. Use of interconnection inductance in place of explicit inductors further helps minimize cost and size of electric power system 200. Additional information on use of interconnection inductance may be found in U.S. Pat. No. 8,872,384 to Stratakos et al, which is incorporated herein by reference.

Figure 4:
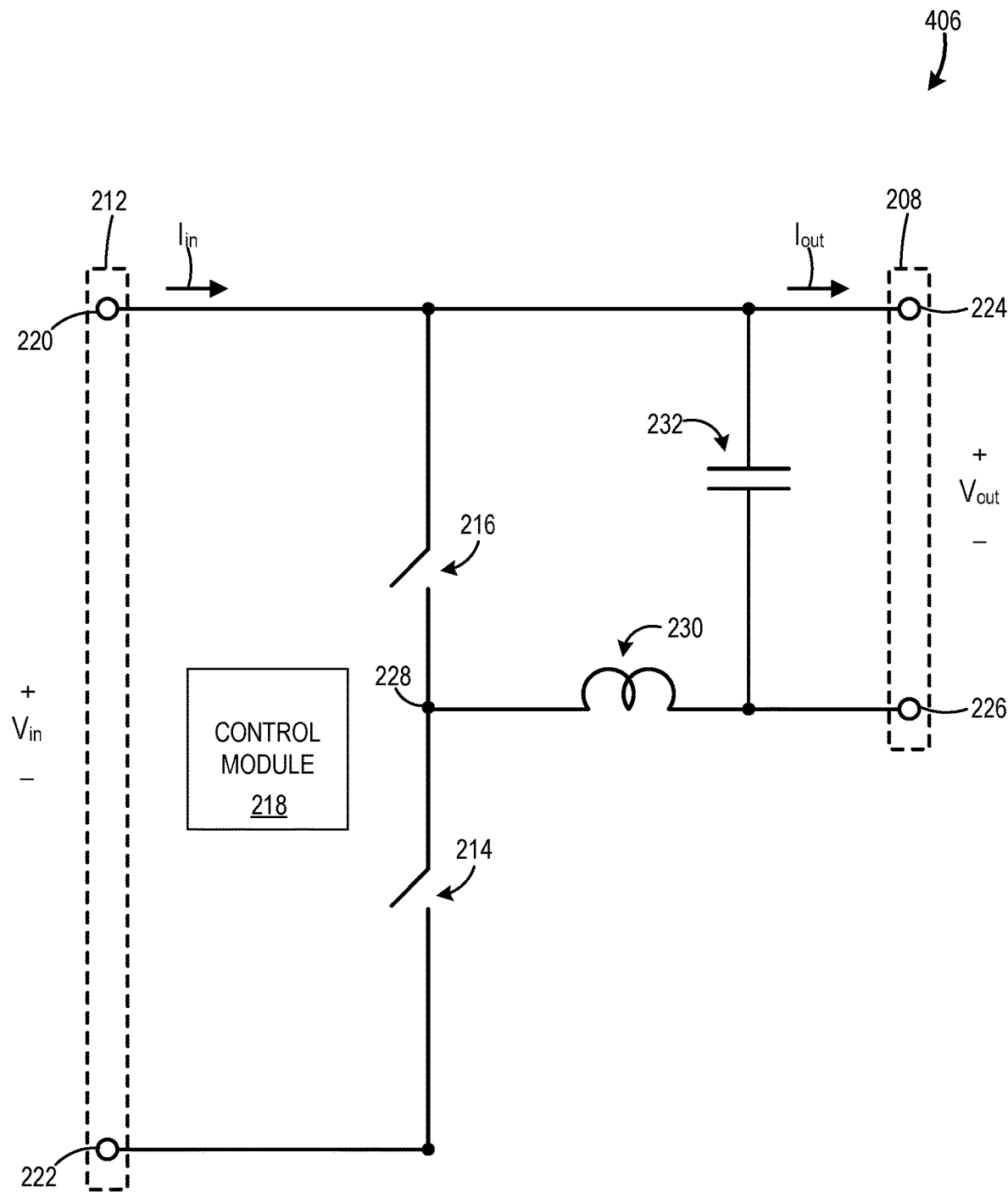
FIG. 4 illustrates a switching circuit like that of FIG. 3 but having an inverted buck-type topology, according to an embodiment.

Switching device 214 is referred to as the "control" switching device because the ratio of input voltage $V_{in}$ across input port 212 to output voltage $V_{out}$ across output port 208 is a function of switching device 214's duty cycle. Switching circuit 206 has a buck-type topology, where an average value of output voltage $V_{out}$ across output port 208 is equal to the product of input voltage $V_{in}$ and duty cycle of control switching device 214, during continuous conduction mode operation. However, the topology of switching circuit 206 could be modified without departing from the scope hereof. For example, FIG. 4 illustrates a switching circuit 406, which is like switching circuit 206, but has an inverted buck-type topology, where the locations of control switching device 214 and freewheeling switching device 216 are swapped relative to switching circuit 206. Additionally, switching circuit 206 could be modified to have a topology other than a buck-type topology, such as a boost-type topology or a buck-boost-type topology.

Figure 5:
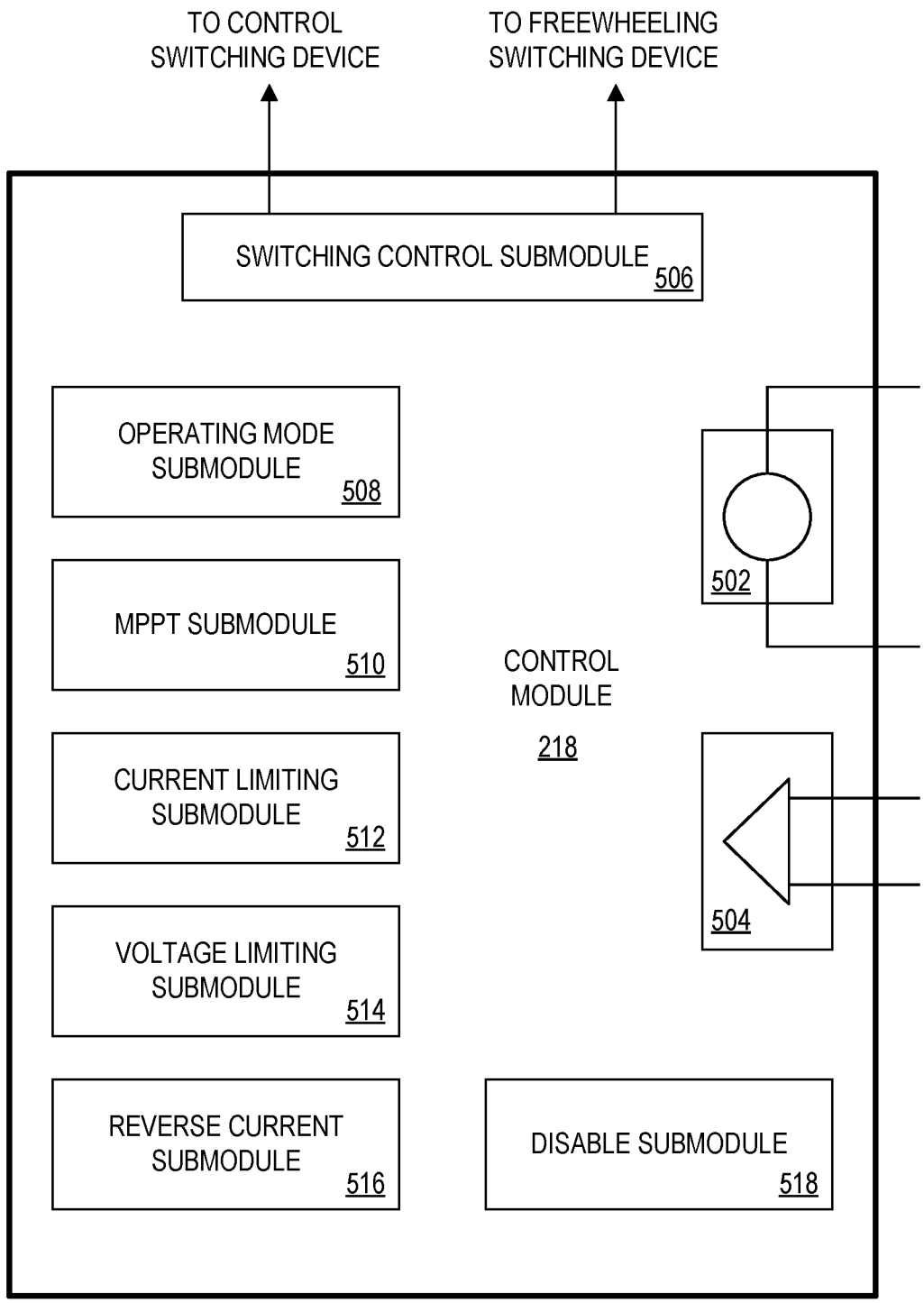
FIG. 5 illustrates a control module of the FIG. 3 switching circuit, according to an embodiment.

FIG. 5 illustrates control module 218, which includes a current sensing submodule 502, a voltage sensing submodule 504, a switching control submodule 506, an operating mode submodule 508, an MPPT submodule 510, a current limiting submodule 512, a voltage limiting submodule 514, a reverse current submodule 516, and a disable submodule 518. Although the submodules of control module 218 are illustrated as discrete elements, one or more of these submodules may be partially or completely combined without departing from the scope hereof. Control module 218 may be implemented by hardware, by a processor executing instructions in the form of software or firmware stored in a memory, or a combination thereof. Switching circuit 206 may further include additional control devices (not shown), without departing from the scope hereof.

Current sensing submodule 502 determines magnitude of output current $I_{out}$, and optionally polarity of output current $I_{out}$, for use at least within control module 218, where output current $I_{out}$ is current flowing through output port 208, i.e. either current flowing out of switching circuit 206 via positive output terminal 224 or current flowing into switching circuit 206 via negative output terminal 226. Magnitude of current flowing through positive output terminal 224 will necessarily be the same as magnitude of current flowing through negative output terminal 226, absent additional circuitry (not shown) in switching circuit 206. In some embodiments, current sensing submodule 502 directly determines magnitude of output current $I_{out}$, such as by sensing a voltage across a current sense resistor electrically coupled in series with output port 208 or by sensing voltage across parasitic resistance of inductor 230. In some other embodiments, current sensing submodule 502 indirectly determines or estimates magnitude of output current $I_{out}$, such as from magnitude of input current $I_{in}$ and duty cycle of control switching device 214, or by using methods disclosed in U.S. Pat. Nos. 6,160,441 and 6,445,244 to Stratakos et al., each of which is incorporated herein by reference.

Voltage sensing submodule 504 determines magnitude of output voltage $V_{out}$ for use at least within control module 218. In some embodiments, voltage sensing submodule 504 directly determines magnitude of output voltage $V_{out}$, such as by sampling voltage across output port 208, while in other embodiments, voltage sensing submodule 504 indirectly determines or estimates magnitude of output voltage $V_{out}$, such as based on magnitude of input voltage $V_{in}$ across input port 212 and duty cycle of control switching device 214. For example, in a particular embodiment, voltage sensing submodule 504 determines output voltage $V_{out}$ from the product of input voltage $V_{in}$ and duty cycle of control switching device 214, during continuous conduction mode operation of switching circuit 206.

Switching control submodule 506 controls operation of control switching device 214 and freewheeling switching device 216 according to a command from one or more of MPPT submodule 510, current limiting submodule 512, voltage limiting submodule 514, reverse current submodule 516, and disable submodule 518. In particular, switching control submodule 506 causes control switching device 214 to repeatedly switch between its conductive and non-conductive states, typically at a frequency at least in the kilohertz range, to transfer power between energy producing device 210 and load 204, under the command of one or more of submodules 510, 512, 514, 516, and 518. Thus, switching circuit 206 can broadly be considered a type of energy coupling device, which electrically couples a respective energy producing device 210 with load 204. In some embodiments, switching control submodule 506 controls switching of control switching device 214 in either a pulse width modulation ("PWM") manner or in a pulse frequency modulation ("PFM") manner, to control parameters of switching circuit 206, such as one or more of magnitude of $V_{out}$, magnitude of $V_{in}$, magnitude of $I_{out}$, and/or magnitude of $I_{in}$. For example, in one particular embodiment, switching control submodule 506 includes a saw-tooth waveform generator and a comparator for comparing the saw-tooth waveform to a control signal, to generate PWM control signals for controlling control switching device 214 to regulate one or more parameters of switching circuit 206.

Switching control submodule 506 also causes freewheeling switching device 216 to switch between its conductive and non-conductive states to perform a freewheeling function, or in other words, to provide a path for current flowing through output port 208 when control switching device 214 is in its non-conductive state. In certain embodiments, switching control submodule 506 causes freewheeling switching device 216 to switch in a complementary manner with control switching device 214, with dead time between successive conduction states to prevent simultaneous conduction of control switching device 214 and freewheeling switching device 216. In some embodiments, switching control submodule 506 is also adapted to cause freewheeling switching device 216 to continuously operate in its conductive state in a bypass operating mode of switching circuit 206. In some alternate embodiments of switching circuit 206, freewheeling switching device 216 is replaced with, or supplemented by, a diode.

Operating mode submodule 508 controls operating mode of switching circuit 206. Switching circuit 206 includes an MPPT operating mode, a current limiting operating mode, a voltage limiting operating mode, a reverse current operating mode, and a disable operating mode. Operating mode submodule 508 switches switching circuit 206 between operating modes, for example, based on magnitude of output current $I_{out}$ determined by current sensing submodule 502 and/or by magnitude of output voltage $V_{out}$ determined by voltage sensing submodule 504, such as discussed below. Accordingly, in certain embodiments, switching circuit 206 is capable of autonomously switching between operating modes based on operating conditions of switching circuit 206, such as based on magnitude of output current $I_{out}$, polarity of output current $I_{out}$, and/or magnitude of output voltage $V_{out}$. Consequentially, in these embodiments, switching circuit 206 is capable of switching between operating modes, as appropriate, without communicating with an external device. For instance, in some embodiments, operating mode submodule 508 causes switching circuit 206 to switch from its MPPT operating mode to its current limiting operating mode, or from its MPPT operating mode to its voltage limiting operating mode, based on (a) output current $I_{out}$ determined by current sensing submodule 502 and/or (b) output voltage $V_{out}$ determined by voltage sensing submodule 504. However, switching circuit 206 is not limited to autonomous operation. For example, in some embodiments, operating mode submodule 508 causes switching circuit 206 to switch to its disable operating mode in response to an external signal, such as a shutdown signal received from an external source.

Switching circuit 206 could be modified to support fewer than all of the aforementioned operating modes. For example, one alternate embodiment of switching circuit 206 does not support the disable operating mode, and consequentially, disable submodule 518 is omitted from control module 218 in this alternate embodiment.

Switching circuit 206 could be modified to not support MPPT, such as in applications where switching circuit 206 is intended solely to perform voltage and/or current limiting. In such alternate embodiments, MPPT submodule 510 is replaced with an alternative submodule (not shown) which causes switching circuit 206 to maintained a fixed relationship between input voltage $V_{in}$ and output voltage $V_{out}$. For example, in one alternate embodiment of switching circuit 206 not supporting MPPT, MPPT submodule 510 is replaced with an alternative submodule which commands switching control submodule 506 to cause control switching device 214 to operate at a fixed duty cycle, such as fixed 100 percent duty cycle.

MPPT submodule 510 supports the MPPT operating mode of switching circuit 206. In particular, MPPT submodule 510 commands switching control submodule 506 to control switching of control switching device 214 in a manner which maximizes an amount of power transferred from energy producing device 210 to load 204, in the MPPT operating mode, such as using a perturb and observe MPPT technique, or another MPPT technique known in the art. In some embodiments, MPPT submodule 510 performs MPPT using techniques disclosed in U.S. Patent Application Publication No. 2014/0103894 to McJimsey et al., which is incorporated herein by reference.

Current limiting submodule 512 supports the current limiting operating mode of switching circuit 206. In particular, current limiting submodule 512 commands switching control submodule 506 to control switching of control switching device 214 in a manner which limits magnitude of output current $I_{out}$ to a maximum current value, such as by limiting duty cycle or frequency of control switching device 214, in the current limiting operating mode. Such limiting of output current $I_{out}$ magnitude advantageously minimizes, or even eliminates, possibility of excessive power consumption, excessive heating, and/or equipment damage resulting from large magnitude of output current $I_{out}$. Limiting magnitude of output current $I_{out}$ may also allow a reduction in current carrying capability of conductors internal and external to switching circuit 206, thereby promoting low cost and small system size. Operating control submodule 508 causes MPPT controller 206 to switch from its MPPT operating mode to its current limiting operating mode, for example, in response to magnitude of output current $I_{out}$, as determined by current sensing submodule 502, reaching or exceeding a threshold value, and/or in response to magnitude of output voltage $V_{out}$, as determined by voltage sensing submodule 504, falling below a threshold value.

Figure 6:
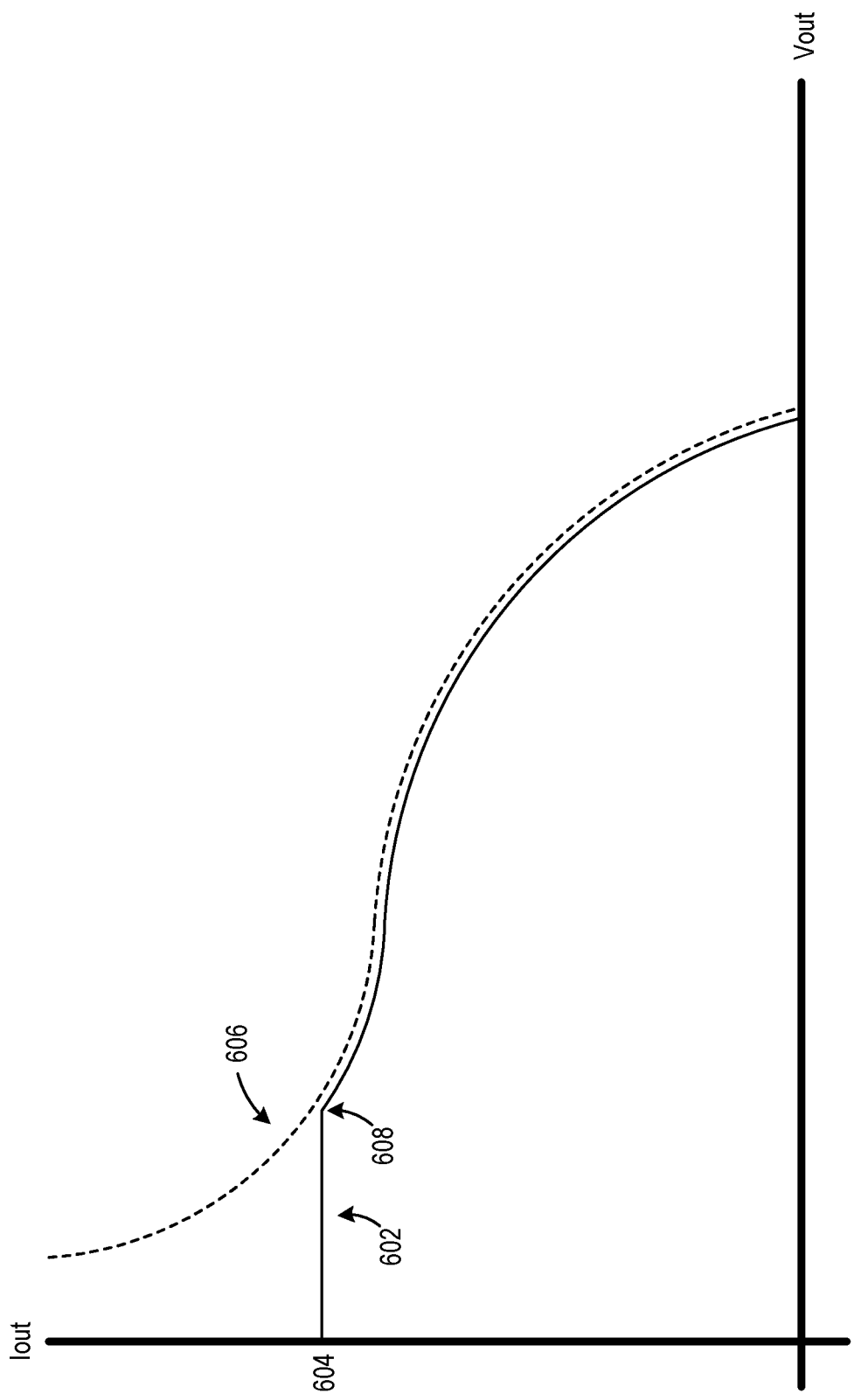
FIG. 6 illustrates an exemplary output current-voltage curve of an embodiment of the FIG. 3 switching circuit having a fixed maximum current value, according to an embodiment.

In some embodiments, the maximum current value is independent of output voltage $V_{out}$. For example, FIG. 6 illustrates an exemplary output current-voltage curve 602 of an embodiment of MPPT controller 206 where energy producing device 210 is a photovoltaic device and the maximum current value is a fixed value 604. Curve 606, shown in dashed lines, illustrates the current-voltage curve of an alternate embodiment of switching circuit 206 not supporting the current limiting operating mode. As can be appreciated from FIG. 6, current limiting submodule 512 commands switching control submodule 506 to prevent output current $I_{out}$ from exceeding fixed value 604 at low values of output voltage $V_{out}$. It should also be appreciated that the transition 608 from the MPPT operating mode to the current limiting operating mode is seamless in that power transfer from energy producing device 210 to load 204 is not interrupted during the operating mode transition.

Figure 7:
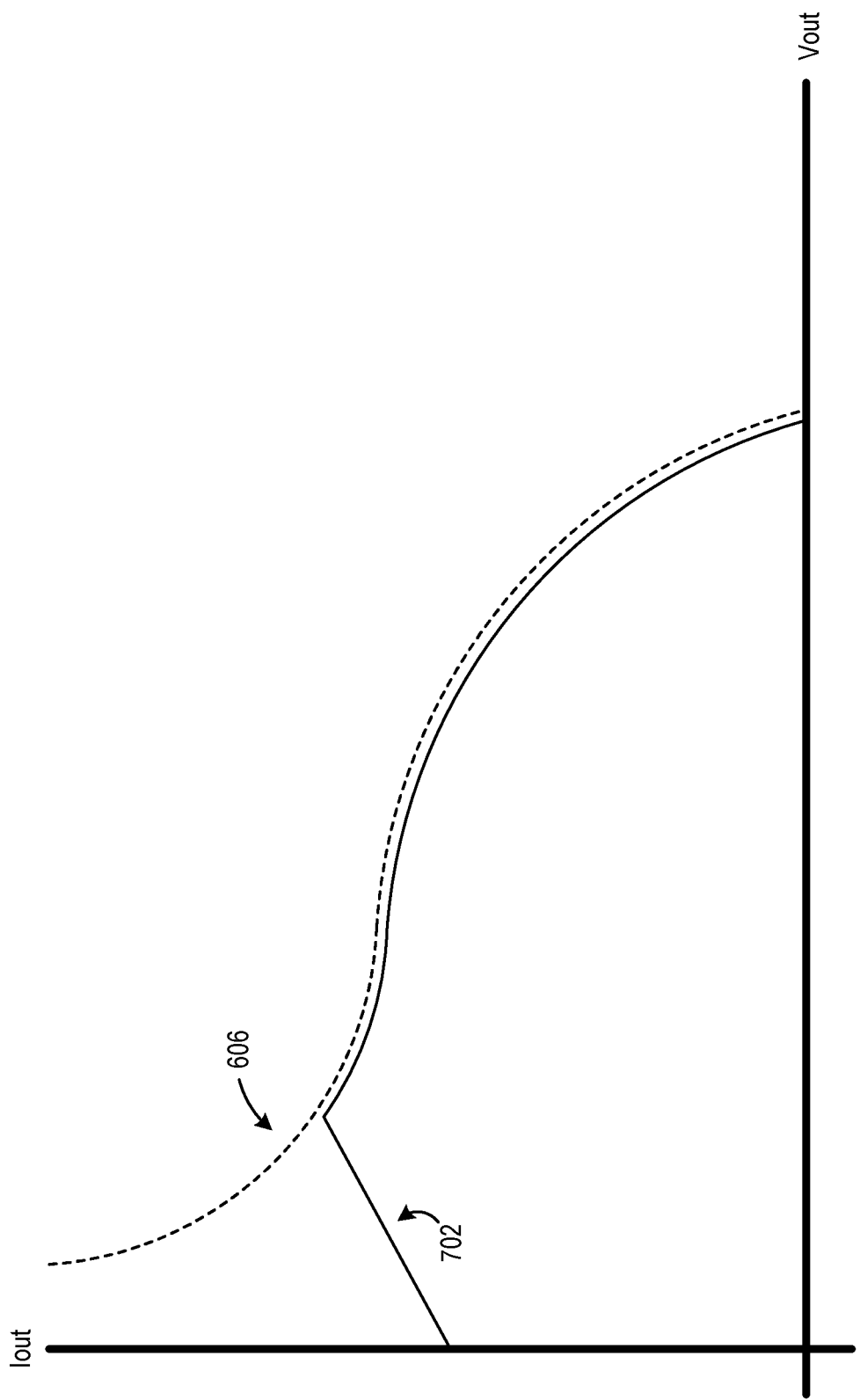
FIG. 7 illustrates an exemplary output current-voltage curve of an embodiment of the FIG. 3 switching circuit having a maximum current value that is a function of output voltage, according to an embodiment.
Figure 8:
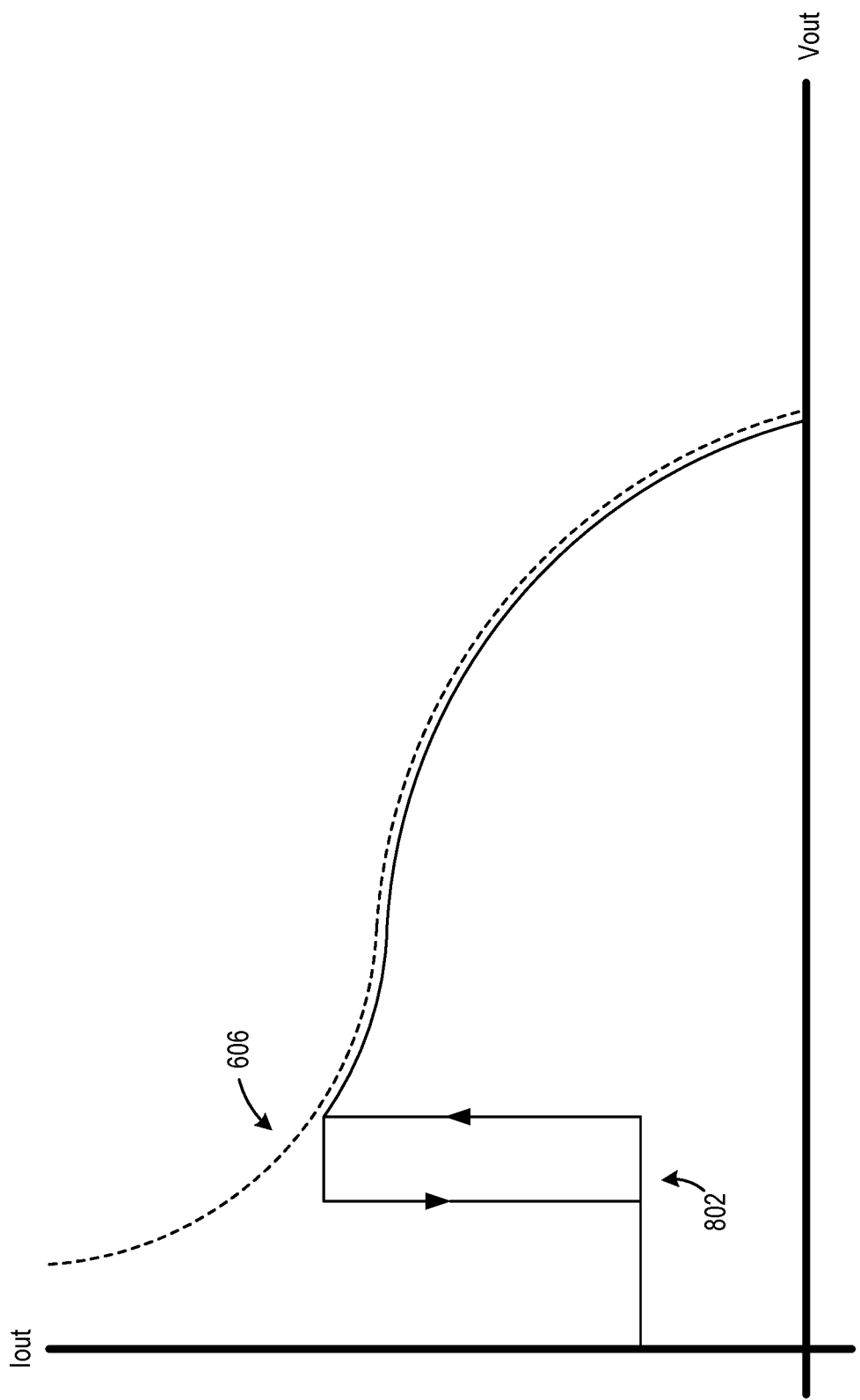
FIG. 8 illustrates an exemplary output current-voltage curve of an embodiment of the FIG. 3 switching circuit having a maximum current value that is a hysteretic function of output voltage, according to an embodiment.

In some other embodiments, the maximum current value is a function of output voltage $V_{out}$. For example, FIG. 7 illustrates an exemplary output current-voltage curve 702 of an embodiment of switching circuit 206 where a maximum output current value is proportional to output voltage $V_{out}$. Although FIG. 7 illustrates a linear relationship between maximum output current value 702 and output voltage $V_{out}$, such relationship could take a different form without departing from the scope hereof. For example, FIG. 8 illustrates an exemplary output current-voltage curve 802 of an embodiment where a maximum output current value has a hysteretic relationship with output voltage $V_{out}$.

In certain embodiments where the maximum output current value has a non-fixed relationship with output voltage $V_{out}$, current limiting submodule 512 optionally further supports a burst current operating submode. The burst current operating submode is characterized by current limiting submodule 512 commanding switching control submodule 506 to control switching of control switching device 214 to temporarily allow magnitude of output current $I_{out}$ to exceed the maximum current value, or in other words, to allow output current $I_{out}$ to "burst" to a higher value, such as on a periodic or a random basis. Such temporary bursting of output current $I_{out}$ may allow switching circuit 206 to "climb out" of a short circuit condition, or in other words, drive output voltage $V_{out}$ sufficiently high to exit the current limiting operating mode while still limiting average magnitude of output current $I_{out}$.

Figure 9:
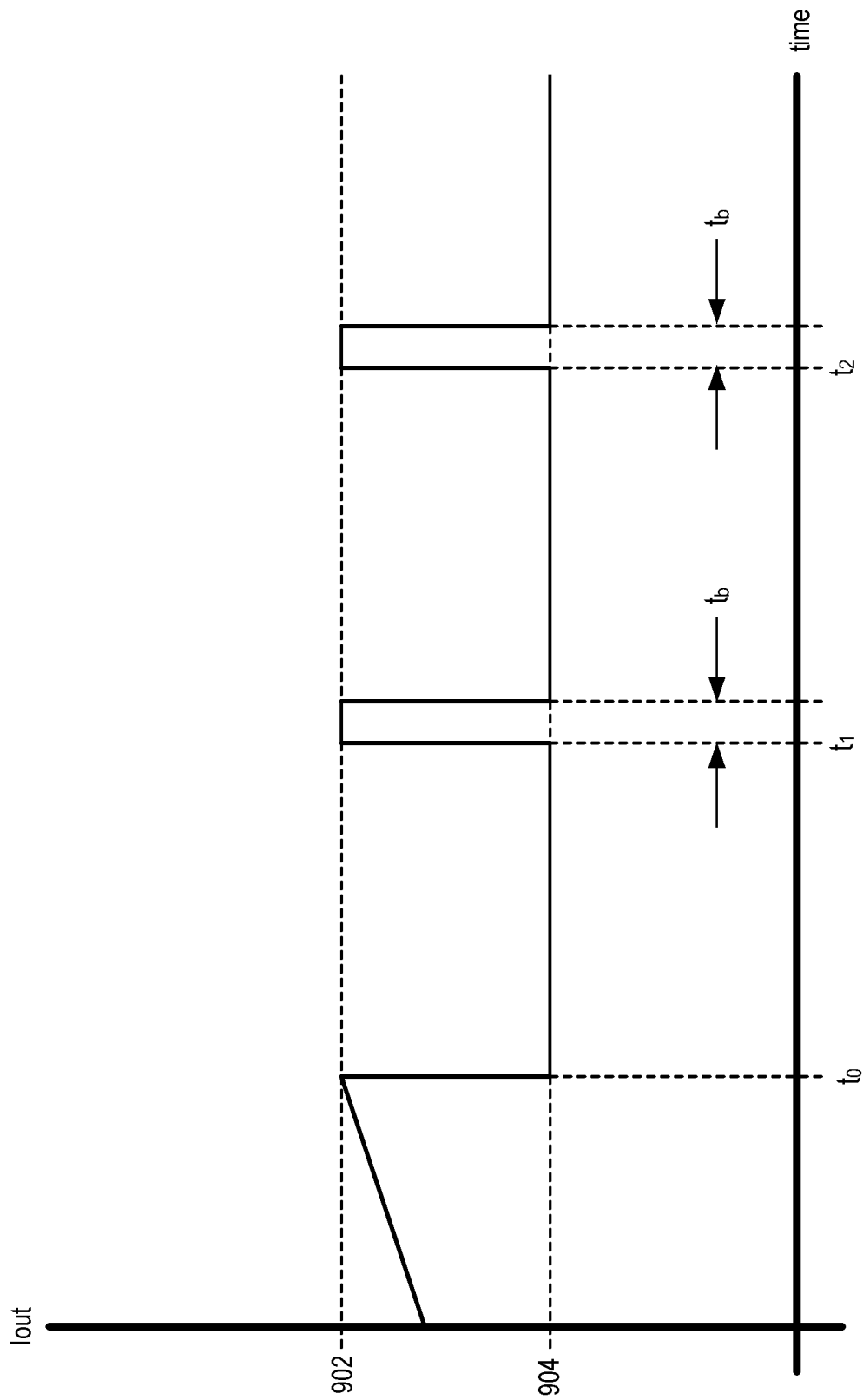
FIG. 9 illustrates one example of a burst current operating submode of an embodiment of the FIG. 3 switching circuit, according to an embodiment.

FIG. 9 is a graph of output current $I_{out}$ verses time illustrating one possible implementation of the burst current operating submode. At time $t_0$, magnitude of output current $I_{out}$ reaches a maximum current threshold 902, and in response, operating mode submodule 508 causes switching circuit 206 to switch from its MPPT operating mode to its current limiting operating mode. Magnitude of output current $I_{out}$ is limited to maximum current value 904 in the current limiting operating mode, in this embodiment. At times $t_1$ and $t_2$, however, current limiting submodule 512 allows magnitude of output current $I_{out}$ to temporarily exceed maximum current value 904 for short a burst period $t_b$. Although FIG. 9 illustrates magnitude of output current $I_{out}$ being limited to maximum current threshold 902 during burst periods $t_b$, the magnitude of output current $I_{out}$ could be limited to a different value during the burst periods.

Voltage limiting submodule 514 supports the voltage limiting operating mode of switching circuit 206. In particular, voltage limiting submodule 514 commands switching control submodule 506 to control switching of control switching device 214 in a manner which limits magnitude of output voltage $V_{out}$ to a maximum voltage value, such as by limiting frequency or duty cycle of control switching device 214, in the voltage limiting operating mode. Such limiting of magnitude of output voltage $V_{out}$ may advantageously minimize, or even eliminate, possibility of electric shock or equipment damage from excessive magnitude of output voltage $V_{out}$. Limiting magnitude of output voltage $V_{out}$ may also reduce likelihood of electrical arcing within electric power system 200. Furthermore, in embodiments where load 204 is replaced with or supplemented by another energy producing device, limiting magnitude of output voltage $V_{out}$ may prevent the other energy producing device from being subject to an overvoltage condition. Operating control submodule 508 causes switching circuit 206 to switch from its MPPT operating mode to its voltage limiting operating mode, for example, in response to magnitude of output voltage $V_{out}$, as determined by voltage sensing submodule 504, reaching or exceeding a threshold value, and/or in response to magnitude of output current $I_{out}$, as determined by current sensing submodule 502, falling below a threshold value.

Figure 10:
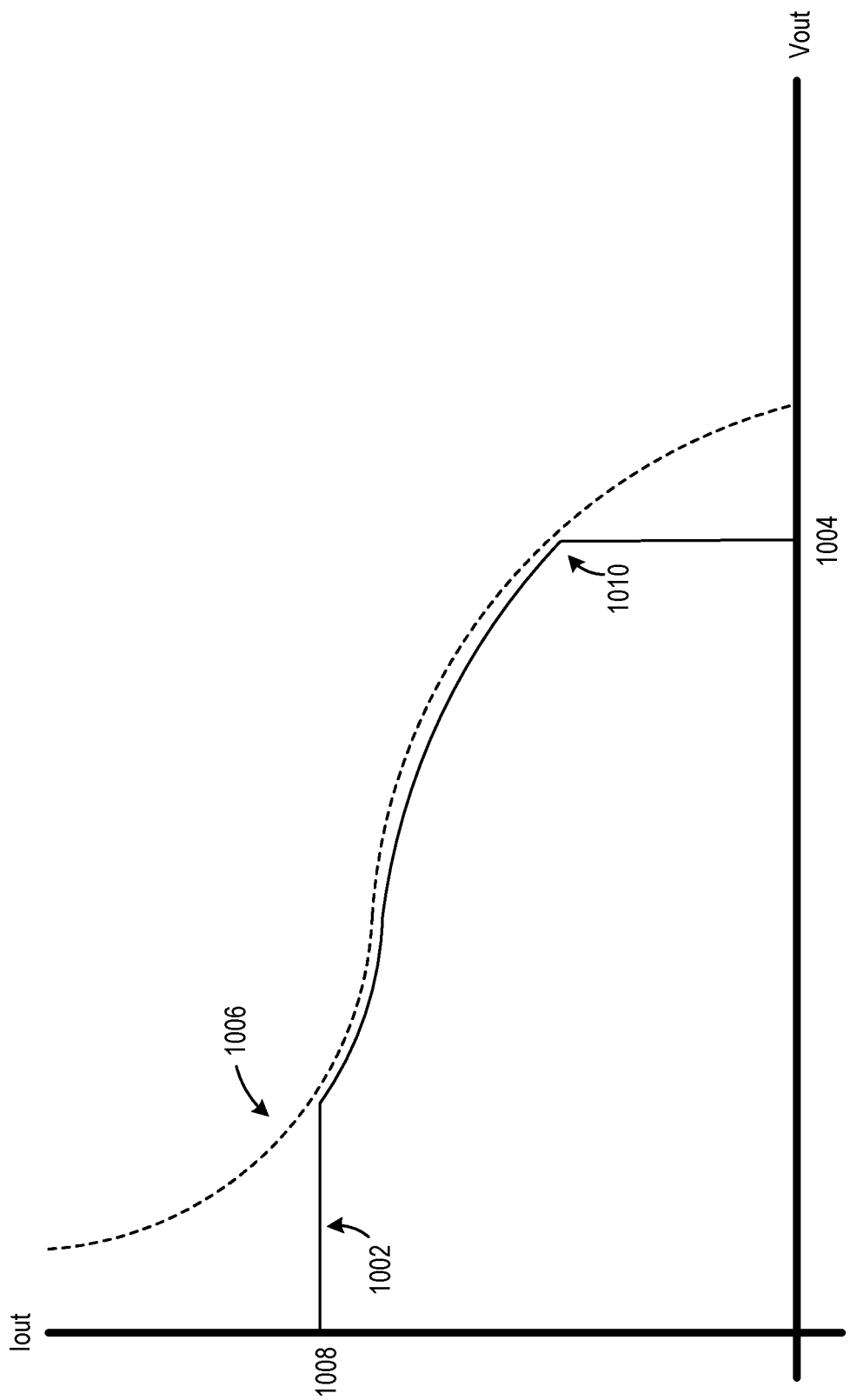
FIG. 10 illustrates an exemplary output current-voltage curve of an embodiment of the FIG. 3 switching circuit having a fixed maximum voltage value, according to an embodiment.
Figure 11:
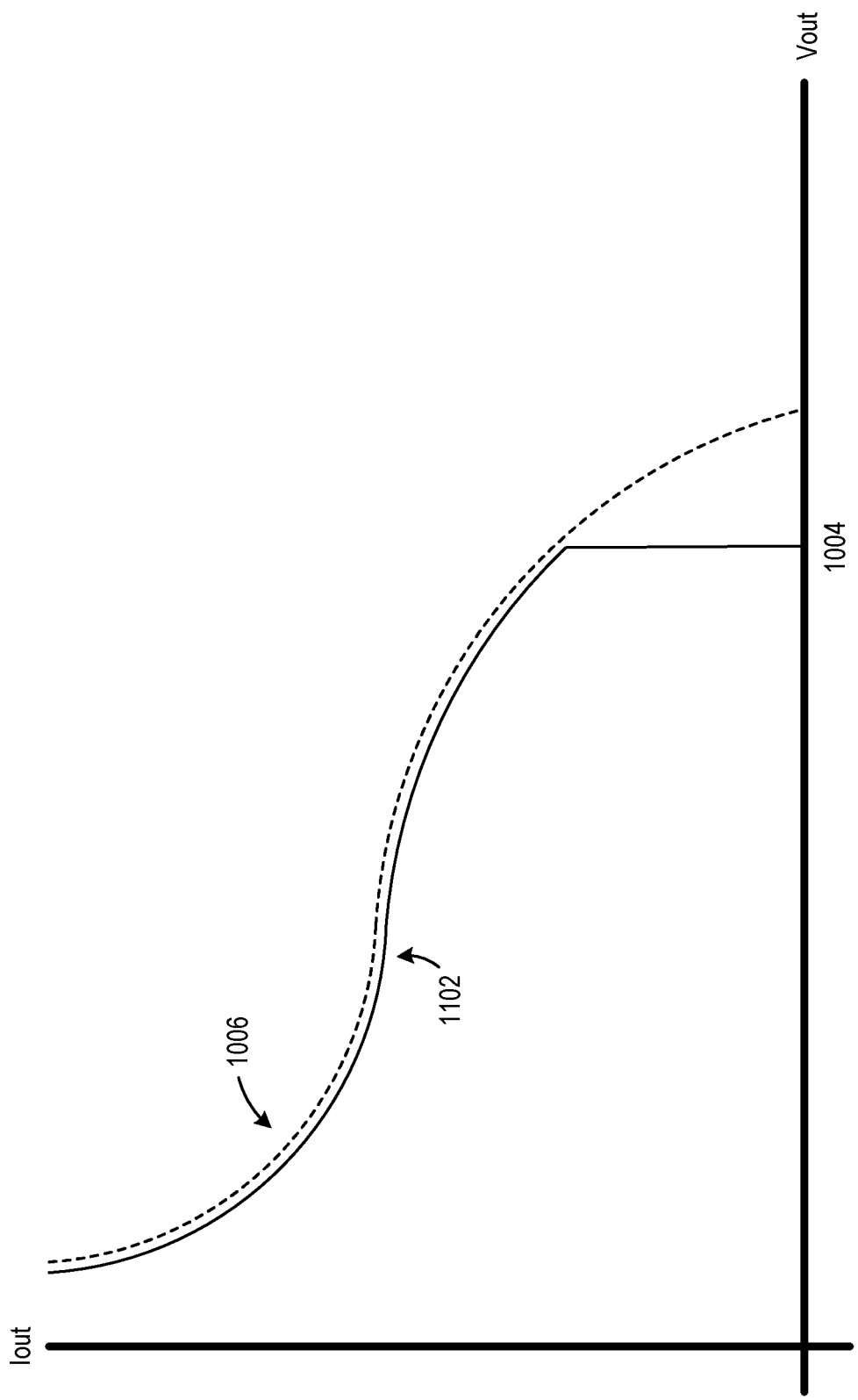
FIG. 11 illustrates an exemplary output current-voltage curve of an embodiment of the FIG. 3 switching circuit like that illustrated in FIG. 10, but not supporting a current limiting operating mode, according to an embodiment.

In some embodiments, the maximum voltage value is independent of output current $I_{out}$. For example, FIG. 10 illustrates an exemplary output current-voltage curve 1002 of an embodiment of switching circuit 206 where energy producing device 210 is a photovoltaic device and the maximum voltage value is a fixed value 1004. Curve 1006, shown in dashed lines, illustrates the current-voltage curve of an alternate embodiment of switching circuit 206 not supporting the voltage limiting operating mode. As can be appreciated from FIG. 10, voltage limiting module 514 prevents output voltage $V_{out}$ from exceeding fixed value 1004 at low values of output current $I_{out}$. It should also be appreciated that the transition 1010 from the MPPT operating mode to the voltage limiting operating mode is seamless in that power transfer from energy producing device 210 to load 204 is not interrupted during the operating mode transition. The embodiment illustrated in FIG. 10 also supports the current limiting operating mode where maximum output current is limited to a fixed maximum current value 1008. However, this embodiment could be modified such that the maximum current value has a different relationship with output voltage $V_{out}$, such as a relationship similar to that illustrated in FIG. 7 or 8. Additionally, the embodiment illustrated in FIG. 10 could be modified to not support the current limiting operating mode. For example, FIG. 11 illustrates an exemplary output current-voltage curve 1102 of an embodiment of switching circuit 206 like that illustrated in FIG. 10, but not supporting the current limiting operating mode.

Figure 12:
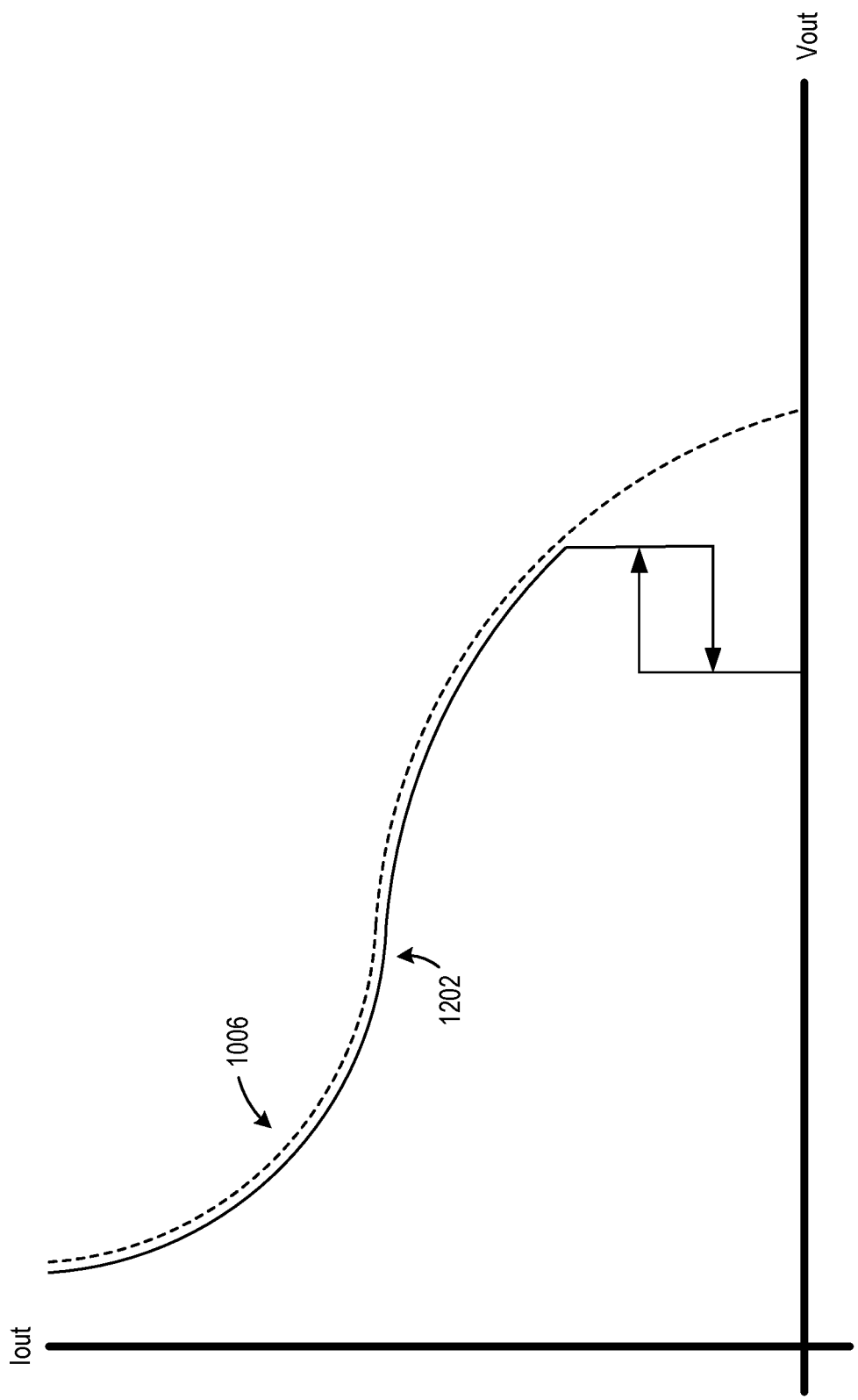
FIG. 12 illustrates an exemplary output current-voltage curve of an embodiment of the FIG. 3 switching circuit like that illustrated in FIG. 11, but having a maximum voltage value that is hysteretic function of output current magnitude, according to an embodiment.

In some other embodiments, the maximum voltage value is a function of output current $I_{out}$. For example, the maximum voltage value could be proportional to output current magnitude, or the maximum voltage value could be a hysteretic function of output current $I_{out}$, in a manner analogous to that discussed above with respect to current limiting submodule 512. For example, FIG. 12 illustrates an exemplary output current-voltage curve 1202 of an embodiment of switching circuit 206 like that illustrated in FIG. 10, but having a maximum voltage value that is a hysteretic function of output current $I_{out}$.

Applicant has further determined that a sharp transition from the MPPT operating mode to the voltage limiting operating mode, such as transition 1010 of FIG. 10, can be problematic in some applications. In particular, a sharp operating mode transition could trigger system instability.

Figure 13:
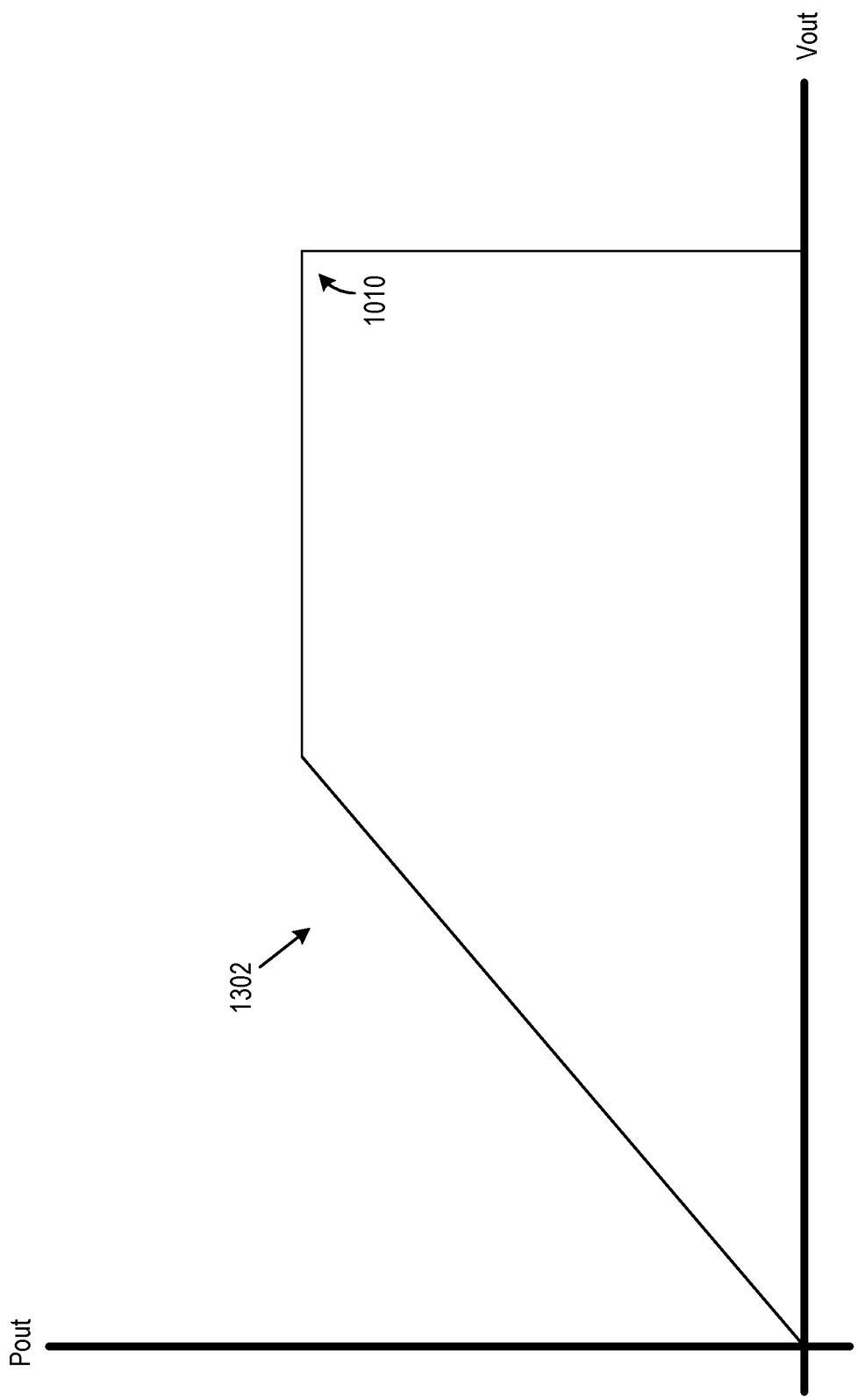
FIG. 13 illustrates an output power-voltage curve corresponding to the output current-voltage curve of FIG. 10.

Additionally, a sharp operating mode transition may impair or eliminate the ability to decrease power output by increasing output voltage beyond the maximum power point, which is sometimes desired when power produced by energy producing devices 210 is greater than power required by load 204. For example, consider a scenario where switching circuit 206 has exemplary output current-voltage curve 1002 of FIG. 10, and it is desired to reduce power output to match a load's power requirements. It is not feasible to reduce power output by increasing output voltage beyond fixed value 1004, because doing so would eliminate power output due to the essentially infinite slope of current-voltage curve 1002 beyond transition 1010. This limitation is evident from FIG. 13, which illustrates an output power-voltage curve 1302 corresponding to output current-voltage curve 1002 of FIG. 10. As shown in FIG. 13, operating switching circuit 206 beyond transition 1010 results in no power output.

Figure 14:
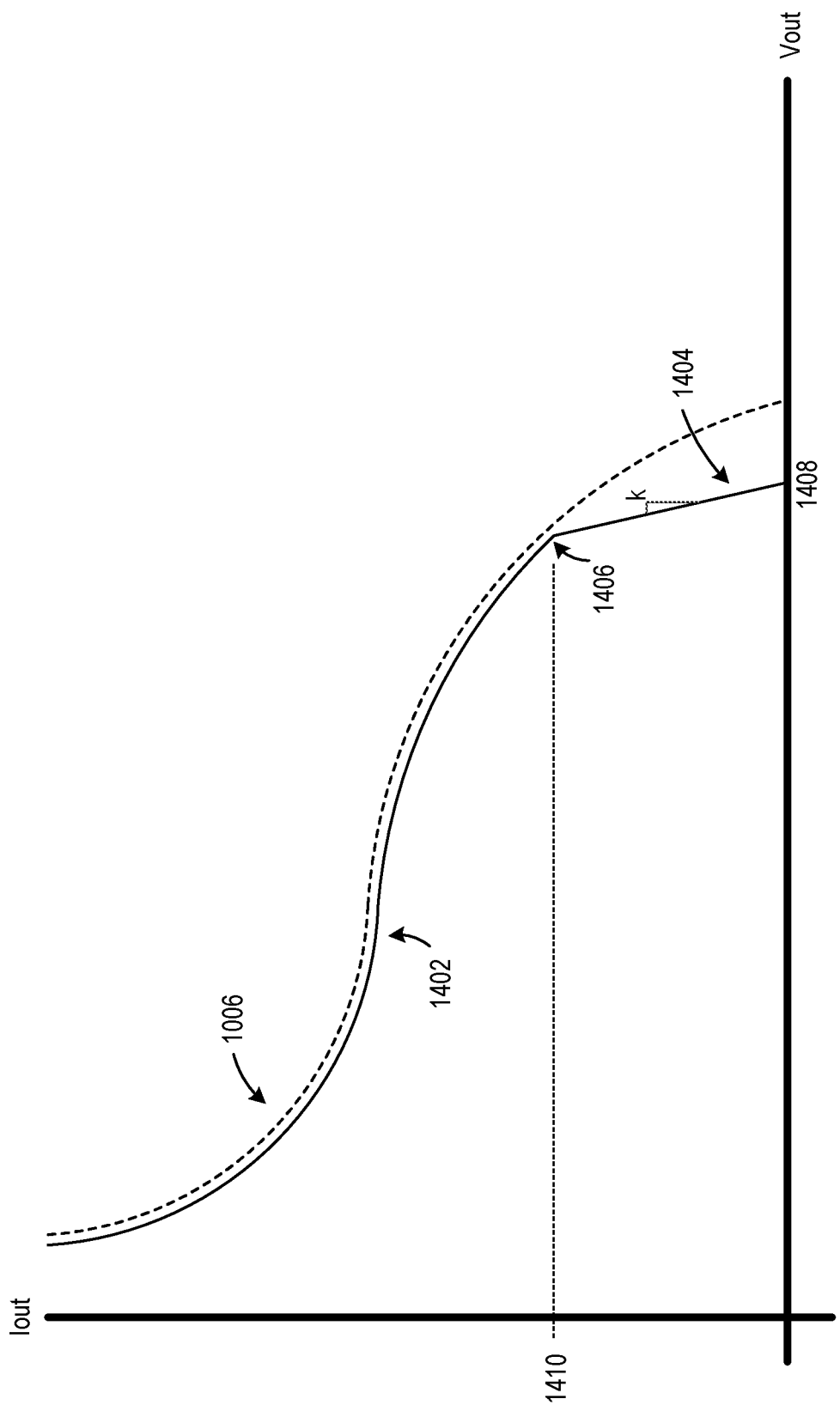
FIG. 14 illustrates an exemplary output current-voltage curve of an embodiment of the FIG. 3 switching circuit like that illustrated in FIG. 11, but having a maximum voltage value corresponding to a curve segment having a finite slope, according to an embodiment.

Accordingly, in some embodiments, voltage limiting submodule 514 commands switching control submodule 506 to control switching of control switching device 214 to limit magnitude of output voltage $V_{out}$ according to a maximum voltage curve having a finite slope, in the voltage limiting operating mode, to soften the transition between the MPPT operating mode and the voltage limiting operating mode. For example, FIG. 14 illustrates an exemplary output current-voltage curve 1402 of an embodiment of switching circuit 206 like that illustrated in FIG. 10, but having a maximum voltage value corresponding to a curve segment 1404 having a finite slope k, where k is the ratio of change in current over change in voltage, in the voltage limiting operating mode. In some embodiments, k is equal to 10 amperes per volt. The fact that curve segment 1404 has finite slope k reduces the sharpness of output current-voltage curve 1402 at transition 1406 between the MPPT operating mode and the voltage limiting operating mode, thereby promoting system stability at transition 1406. The finite slope of curve segment 1404 may also enable reducing output power by increasing output voltage beyond the maximum power point, since output power does not abruptly drop to zero at transition 1406.

Figure 15:
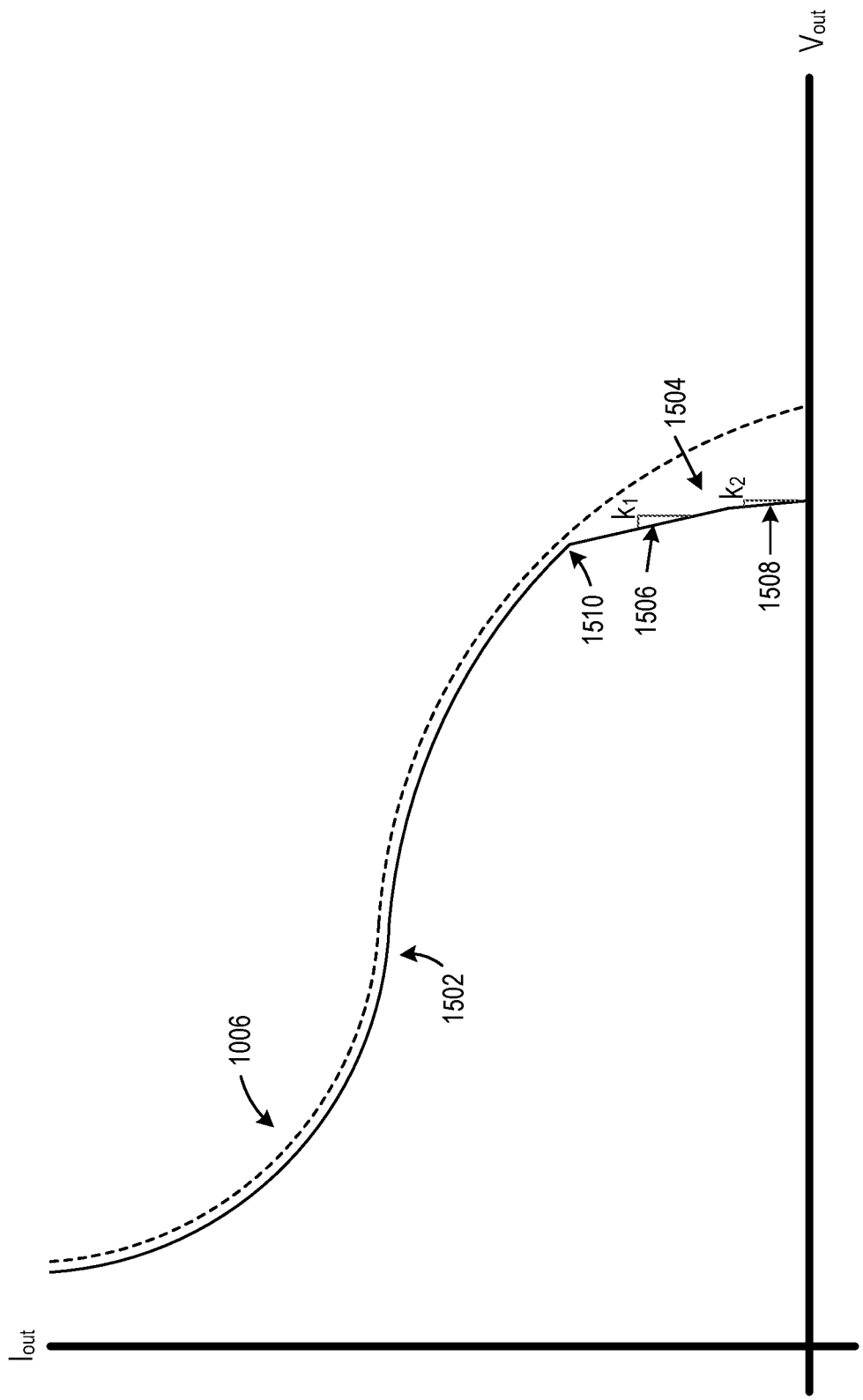
FIG. 15 illustrates an exemplary output current-voltage curve of an embodiment of the FIG. 3 switching circuit like that illustrated in FIG. 11, but having a maximum voltage value corresponding to a non-linear curve segment, according to an embodiment.
Figure 16:
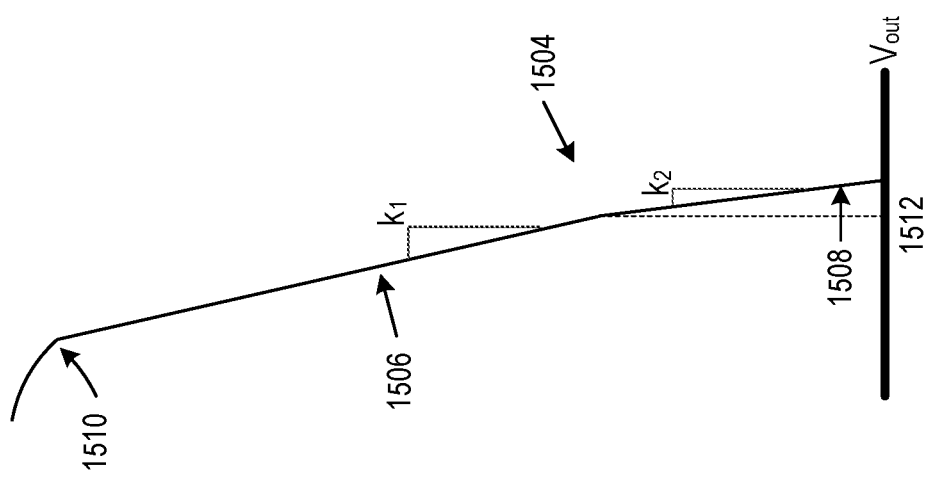
FIG. 16 is a magnified view of the non-linear curve segment of FIG. 15.

In some other embodiments, voltage limiting submodule 514 commands switching control submodule 506 to control switching of control switching device 214 to limit magnitude of output voltage $V_{out}$ according to a maximum voltage curve that is non-linear, in the voltage limiting operating mode. For example, FIG. 15 illustrates an exemplary output current-voltage curve 1502 of an embodiment of switching circuit 206 like that illustrated in FIG. 10, but having a maximum voltage value corresponding to a non-linear curve segment 1504, in the voltage limiting operating mode. FIG. 16 is a magnified view of non-linear curve segment 1504. Curve segment 1504 has a first portion 1506 and a second portion 1508. First portion 1506 has a slope $k_1$, and second portion 1508 has a slope $k_2$, where slope $k_2$ is greater than slope $k_1$. The relatively small slope $k_1$ of first portion 1506 advantageously promotes system stability and ability to reduce power output by increasing output voltage beyond the maximum power point, while the relatively large slope $k_2$ of second portion 1508 helps prevent excessive output voltage magnitude. Second portion 1508 is remote from transition 1510 between the MPPT operating mode and the voltage limiting operating mode. Consequently, slope $k_2$ of second portion 1508 can be very large, and even infinite, without negatively impacting system stability or unduly limiting operation above the maximum power point. Curve segment 1504 could be modified to have additional portions, or to have a different shape, without departing from the scope hereof.

Figure 17:
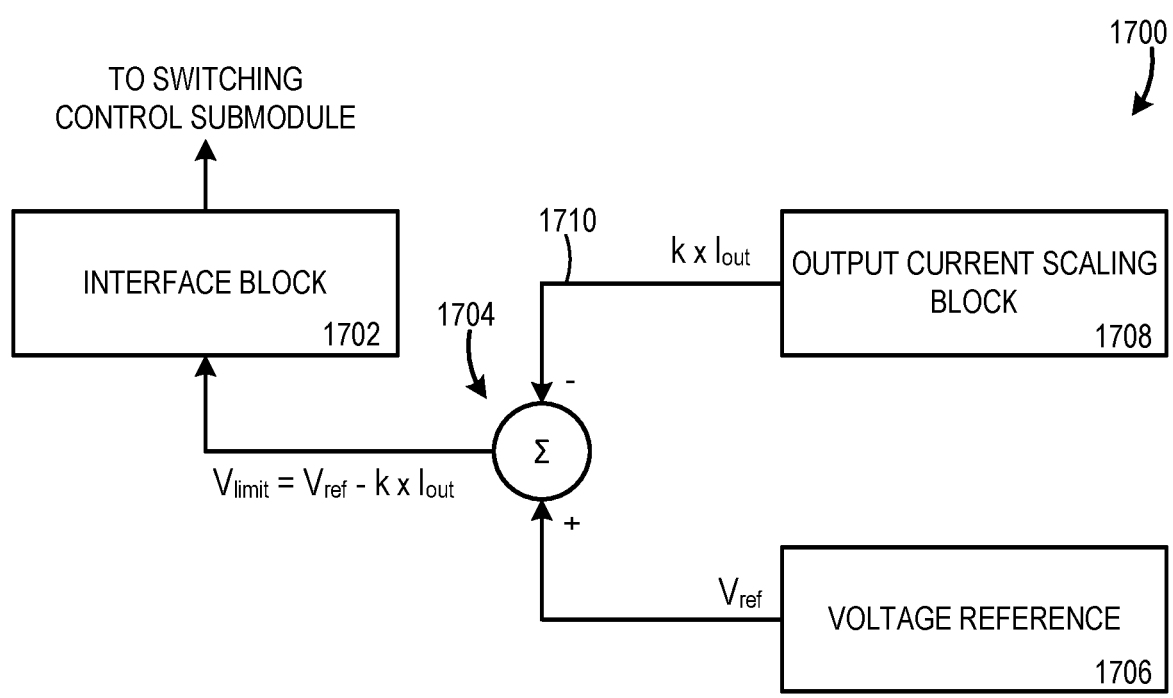
FIG. 17 illustrates one possible embodiment of a voltage limiting submodule for use where the output current-voltage curve is linear and has a finite slope, according to an embodiment.

FIG. 17 illustrates a voltage limiting submodule 1700, which is one possible embodiment of voltage limiting submodule 514 for use in embodiments where the output current-voltage curve is linear and has a finite slope, such as the embodiment illustrated in FIG. 14. Voltage limiting submodule 1700 includes an interface block 1702, a subtraction block 1704, a voltage reference 1706, and an output current scaling block 1708. Voltage reference 1706 provides a voltage reference $V_{ref}$ equal in magnitude to the zero-current intercept of the output current-voltage curve, such as zero-current intercept 1408 in FIG. 14. Output current scaling block 1708 generates a signal 1710 having magnitude $k \times I_{out}$, where $I_{out}$ is magnitude of current flowing through output port 208 as determined by current sensing submodule 502, and k is the slope of the output current-voltage curve in the voltage limiting operating mode. Subtraction block 1704 subtracts signal 1710 from voltage reference $V_{ref}$ to yield output voltage command $V_{limit}$, such that $V_{limit} = V_{ref} - k \times I_{out}$. Interface block 1702 cooperates with switching control submodule 506 to control switching of control switching device 214 to limit output voltage $V_{out}$ to output voltage command $V_{limit}$, in the voltage limiting operating mode.

Figure 18:
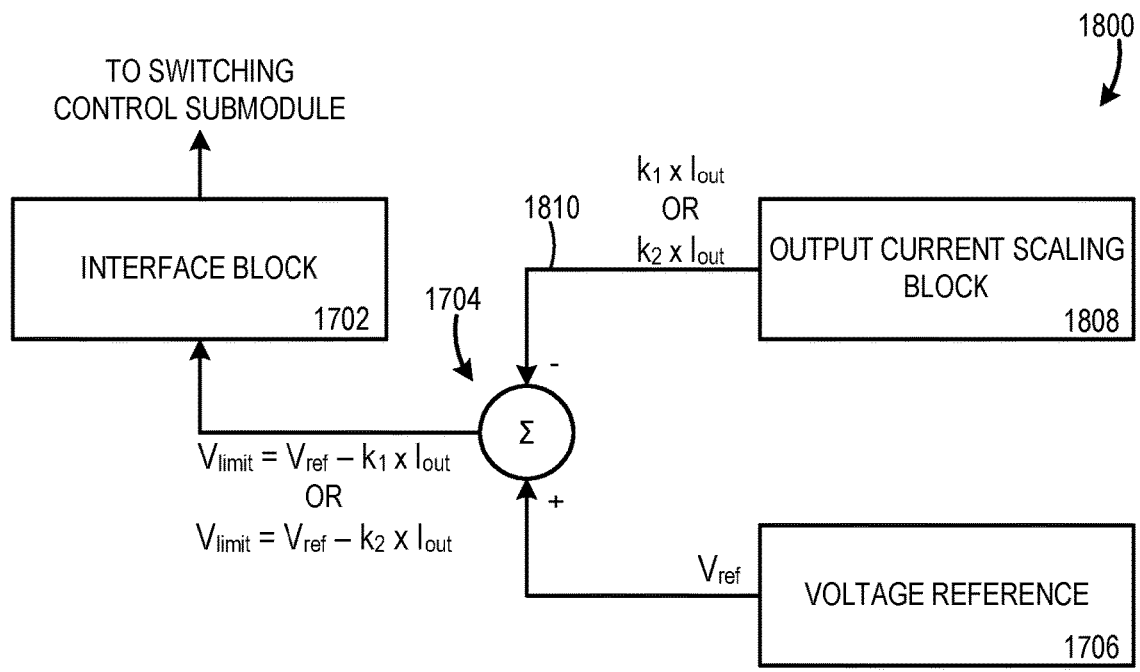
FIG. 18 illustrates one possible embodiment of a voltage limiting submodule for use where the output current-voltage curve is non-linear, according to an embodiment.

FIG. 18 illustrates a voltage limiting submodule 1800, which is one possible embodiment of voltage limiting submodule 514 for use in embodiments where the output current-voltage curve is non-linear, such as the embodiment illustrated in FIG. 15. Voltage limiting submodule 1800 is similar to voltage limiting submodule 1700 of FIG. 17, but with output current scaling block 1708 replaced with output current scaling block 1808. Output current scaling block 1808 generates a signal 1810 having a magnitude as follows: (1) $k_1 \times I_{out}$ when magnitude of $I_{out}$ is greater than or equal to a threshold value, such as threshold value 1512 in FIG. 16, and (2) $k_2 \times I_{out}$ when magnitude of $I_{out}$ is less than the threshold value, where $k_2$ is greater than $k_1$. In some embodiments, $k_2$ and $k_1$ are the same as slopes $k_2$ and $k_1$, respectively, of FIGS. 15 and 16. In some other embodiments, output current scaling block 1808 determines which expression to use when generating signal 1810 based on output power magnitude, or an external signal, instead of output current magnitude. For example, in some alternate embodiments, output current scaling block 1808 generates signal 1810 having a magnitude as follows: (1) $k_1 \times I_{out}$ when magnitude of output power is greater than or equal to a threshold value, and (2) $k_2 \times I_{out}$ when magnitude of output power is less than the threshold value, where $k_2$ is greater than $k_1$.

Subtraction block 1704 subtracts signal 1810 from voltage $V_{ref}$ to yield output voltage command $V_{limit}$, such that $V_{limit} = V_{ref} - k_1 \times I_{out}$ or $V_{limit} = V_{ref} - k_2 \times I_{out}$, depending on the magnitude of output current $I_{out}$ or output power. Interface block 1702 cooperates with switching control submodule 506 to control switching of control switching device 214 to limit output voltage $V_{out}$ to output command $V_{limit}$, in the voltage limiting operating mode.

Figure 19:
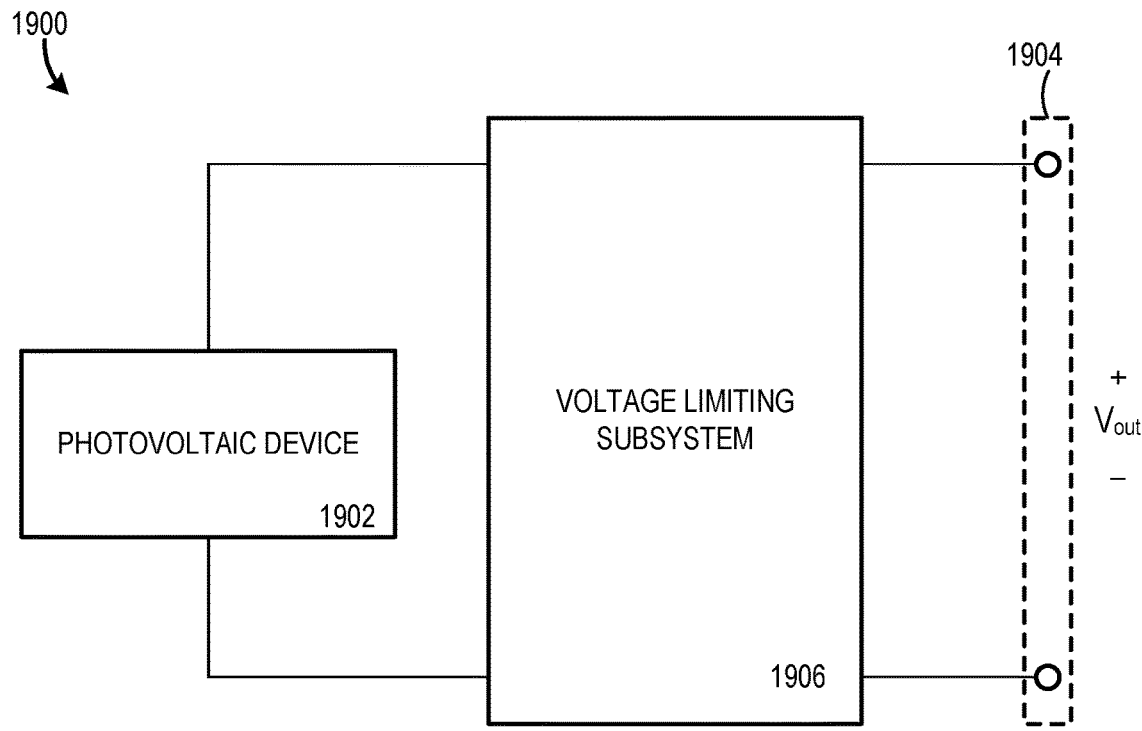
FIG. 19 illustrates a photovoltaic system including a voltage limiting subsystem, according to an embodiment.

It should be appreciated that the technique of limiting output voltage according to a maximum voltage curve having a finite slope is not limited to the embodiments discussed above. Instead, the technique could be applied to any photovoltaic application where maximum output voltage is limited, including applications without maximum power point tracking. For example, FIG. 19 illustrates a photovoltaic system 1900 including a photovoltaic device

1902, an output port 1904, and a voltage limiting subsystem 1906. Photovoltaic device 1902 includes one or more photovoltaic cells electrically coupled together, and in some embodiments, photovoltaic device 1902 is a photovoltaic module or a photovoltaic panel.

Figure 20:
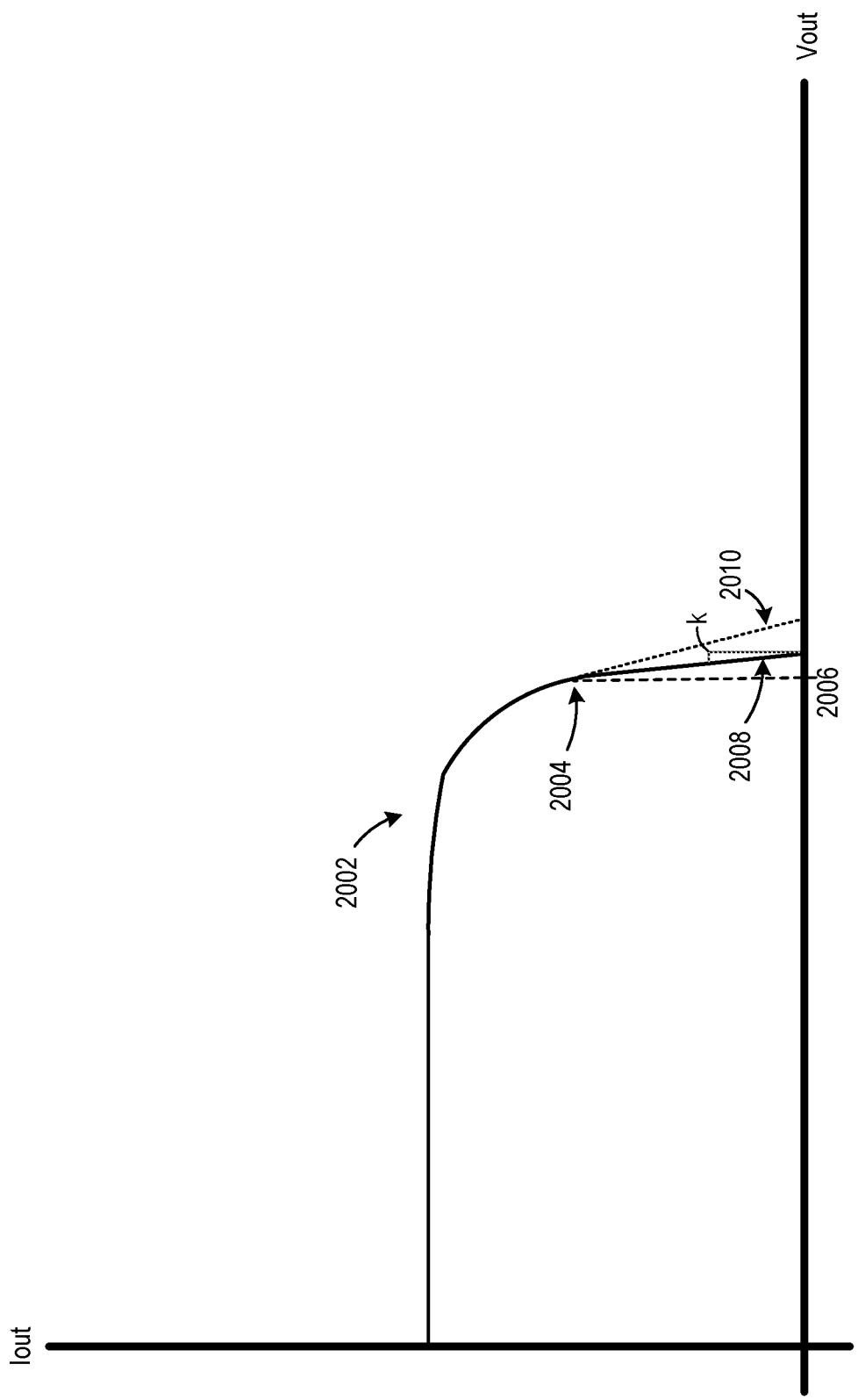
FIG. 20 illustrates an exemplary output current-voltage curve of the FIG. 19 photovoltaic system.

FIG. 20 illustrates an exemplary output current-voltage curve 2002 of photovoltaic system 1900. During normal operation, which corresponds to operation left of transition point 2004 in FIG. 20, voltage limiting subsystem 1906 does not affect operation of photovoltaic system 1900, and output voltage $V_{out}$ across output port 1904 is the same as voltage across photovoltaic device 1902. When voltage $V_{out}$ across output port 1904 reaches threshold value 2006, photovoltaic system 1900 switches from normal operation to a voltage limiting operating mode, corresponding to operation to the right of transition point 2004. Voltage limiting subsystem 1906 limits magnitude of output voltage $V_{out}$ according to a segment 2008 of curve 2002, which has a finite slope k, in the voltage limiting operating mode. Dashed line 2010 shows what the right portion of the output current-voltage curve would be if voltage limiting subsystem 1906 were not present. Voltage limiting subsystem 1906 could be modified so that segment 2008 is non-linear, such as having a shape similar to that discussed above with respect to FIG. 15. In some embodiments, voltage limiting subsystem 1906 is implemented with a switching circuit similar to that of FIG. 2 or 4, where control module 218 includes only voltage sensing submodule 504, switching control submodule 506, operating mode submodule 508, and voltage limiting submodule 514. However, voltage limiting subsystem 1906 could take the form of a different power converter, such as a buck-boost-type or a Cúk converter electrically coupled in series with photovoltaic device 1902 and output port 1904, or a shunt regulator, without departing from the scope hereof.

Returning to FIGS. 3 and 5, the characteristics of the maximum current value of current limiting submodule 512 and the characteristics of the maximum voltage value of voltage limiting submodule 514 are, for example, set during the manufacture, installation, or power-up of switching circuit 206. In some embodiments, however, the characteristics of these values may be adjusted during operation of switching circuit 206, such as to allow for reconfiguration of the switching circuit in response to operating environment changes.

Reverse current submodule 516 supports the reverse current operating mode of switching circuit 206. Operating mode submodule 508 causes switching circuit 206 to operate in its reverse current operating mode, for example, when a DC component of output current $I_{out}$, as determined by current sensing submodule 502, has a negative polarity and is therefore flowing in a reverse or negative direction, i.e., into switching circuit 206 via positive output terminal 224 of output port 208 instead of out of switching circuit 206 via positive output terminal 224. In certain embodiments, operating mode submodule 508 detects a reverse current condition by detecting magnitude of output current $I_{out}$, as determined by current sensing submodule 502, falling below a threshold value, where the threshold value is zero amperes or near zero amperes, such as slightly above or below zero amperes. Thus, a reverse current condition may include a condition where output current $I_{out}$ has a slight positive value, as well as where output current $I_{out}$ has a negative value. In certain other embodiments, operating mode submodule 508 detects a reverse current condition by detecting a change in polarity of output current $I_{out}$. A reverse current condition may occur, for example, if one string 202 shuts down before another string 202, if one string 202 is intentionally disabled, or if one string 202 is producing more energy than another string 202. As discussed above, strings of photovoltaic devices are prone to significant current imbalance during a reverse current condition, and blocking diodes are sometimes provided to block reverse current.

Limiting output voltage $V_{out}$ magnitude is beneficial in many situations, as discussed above. However, it may be desirable to allow output voltage $V_{out}$ to rise in a reverse current condition to limit reverse current magnitude. In particular, allowing output voltage $V_{out}$ to track input voltage $V_{in}$ during a reverse current condition results in negative current feedback, sometimes referred to as "stand-off", which helps prevent conduction of reverse current. Accordingly, in certain embodiments, operating mode submodule 508 causes switching circuit 206 to switch from its voltage limiting operating mode to its reverse current operating mode in response to detection of a reverse current condition. Reverse current submodule 516 increases the maximum voltage value from its most-recent value in the voltage limiting operating mode to a higher value, such that output voltage $V_{out}$ is allowed to rise and track input voltage $V_{in}$. Additionally, in some alternate embodiments of switching circuit 206 having a voltage boosting capability, such as a boost-type or a buck-boost-type topology, magnitude of output voltage $V_{out}$ may be greater than magnitude of input voltage $V_{in}$ in the reverse current operating mode. Implementation of the reverse current operating mode in switching circuit 206 may advantageously eliminate the need for blocking diodes in strings 202, thereby promoting low system cost and high system reliability.

Figure 21:
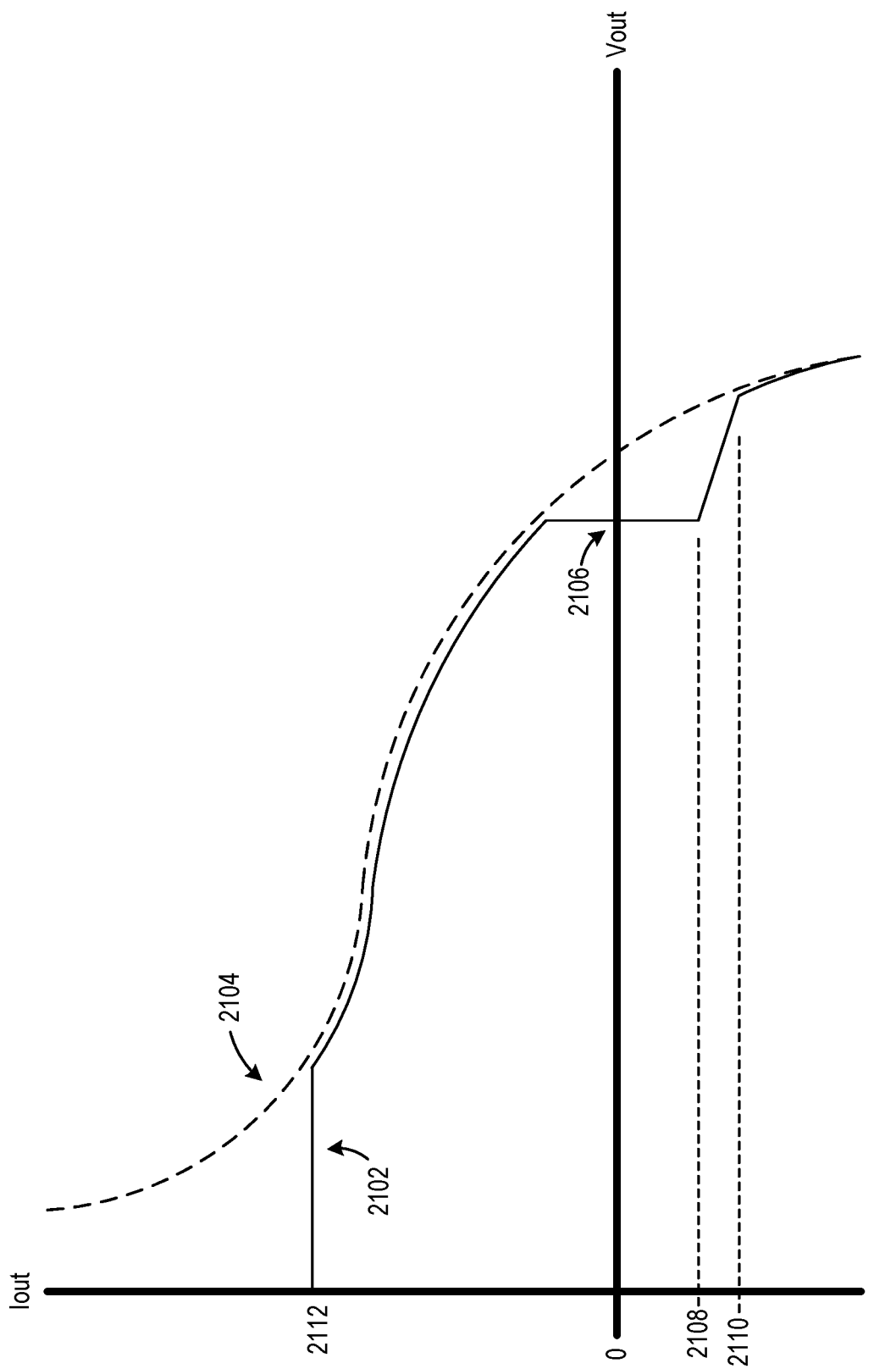
FIG. 21 illustrates an exemplary output current-voltage curve of an embodiment of the FIG. 3 switching circuit having a maximum voltage value that is a function of output current in a reverse current operating mode, according to an embodiment.

In some embodiments, reverse current submodule 516 increases the maximum voltage value as a function of the absolute value of output current $I_{out}$, such that output voltage $V_{out}$ is allowed to rise and track input voltage $V_{in}$. FIG. 21 is an exemplary output current-voltage curve 2102 illustrating one example of an embodiment of switching circuit 206 implementing the reverse current operating mode in such manner. Curve 2104, shown in dashed lines, illustrates the current-voltage curve of an alternate embodiment of switching circuit 206 not supporting the voltage or current limiting operating modes. In this example, operating mode submodule 508 causes switching circuit 206 to switch from its MPPT operating mode to its voltage limiting operating mode when output voltage $V_{out}$, as determined by voltage sensing submodule 504, reaches threshold 2106. When output current $I_{out}$, as determined by current sensing submodule 502, falls below threshold 2108, which represents a reverse current condition, operating mode submodule 508 causes switching circuit 206 to switch from its voltage limiting operating mode to its reverse current operating mode. Reverse current submodule 516 increases the maximum voltage value in the reverse current operating mode in proportion to absolute magnitude of output current $I_{out}$. Consequently, output voltage $V_{out}$ increases as absolute value of output current $I_{out}$ magnitude increases, in the reverse current operating mode. Output voltage $V_{out}$ tracks input voltage $V_{in}$ once absolute value of output current $I_{out}$ magnitude reaches threshold 2110.

Figure 22:
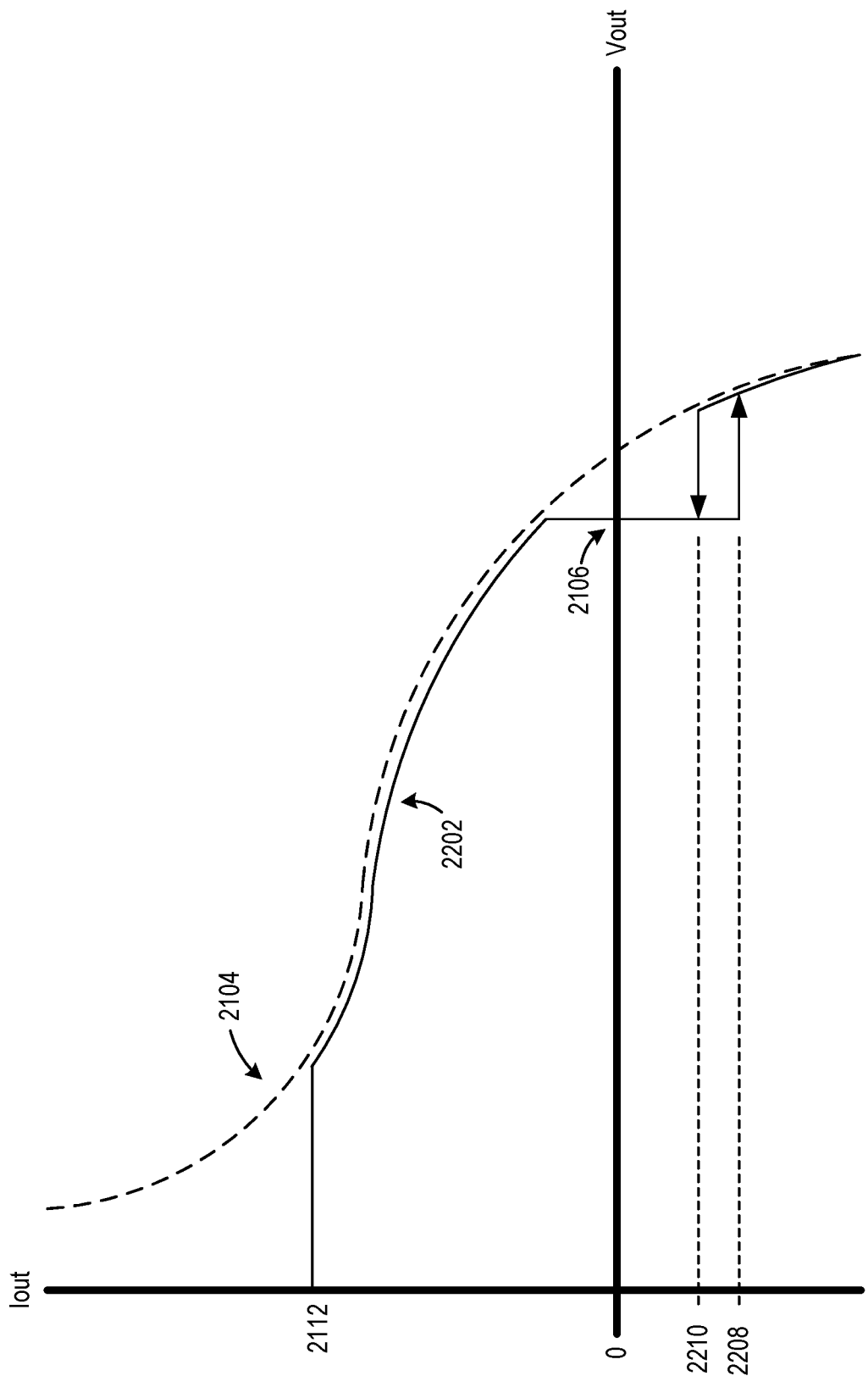
FIG. 22 illustrates an exemplary output current-voltage curve of an embodiment of the FIG. 3 switching circuit like that illustrated in FIG. 21, but where the maximum voltage value has a hysteretic relationship with input current in the reverse current operating mode, according to an embodiment.

Although FIG. 21 shows the relationship between the maximum voltage value and output current $I_{out}$ being linear between thresholds 2108 and 2110, the maximum voltage value could have a different relationship, such as hysteretic relationship, with output current $I_{out}$. For example, FIG. 22 is an exemplary output current-voltage curve 2202 illustrating one example of an embodiment of switching circuit 206 having a hysteretic relationship between the maximum voltage value and output current $I_{out}$ in the reverse current operating mode. In particular, the switching circuit enters the reverse current operating mode when output current $I_{out}$, as determined by current sensing submodule 502, drops below threshold 2208, and the switching circuit exits the reverse current operating mode when output current $I_{out}$ rises above threshold 2210.

The embodiment illustrated in FIG. 21 also supports the current limiting operating mode where maximum output current is limited to a fixed maximum current value 2112. However, this embodiment could be modified such that the maximum current value has a different relationship with output voltage $V_{out}$, such as a relationship similar to that illustrated in FIG. 7 or 8. Additionally, the FIG. 21 embodiment could be modified to not support the current limiting operating mode.

Figure 23:
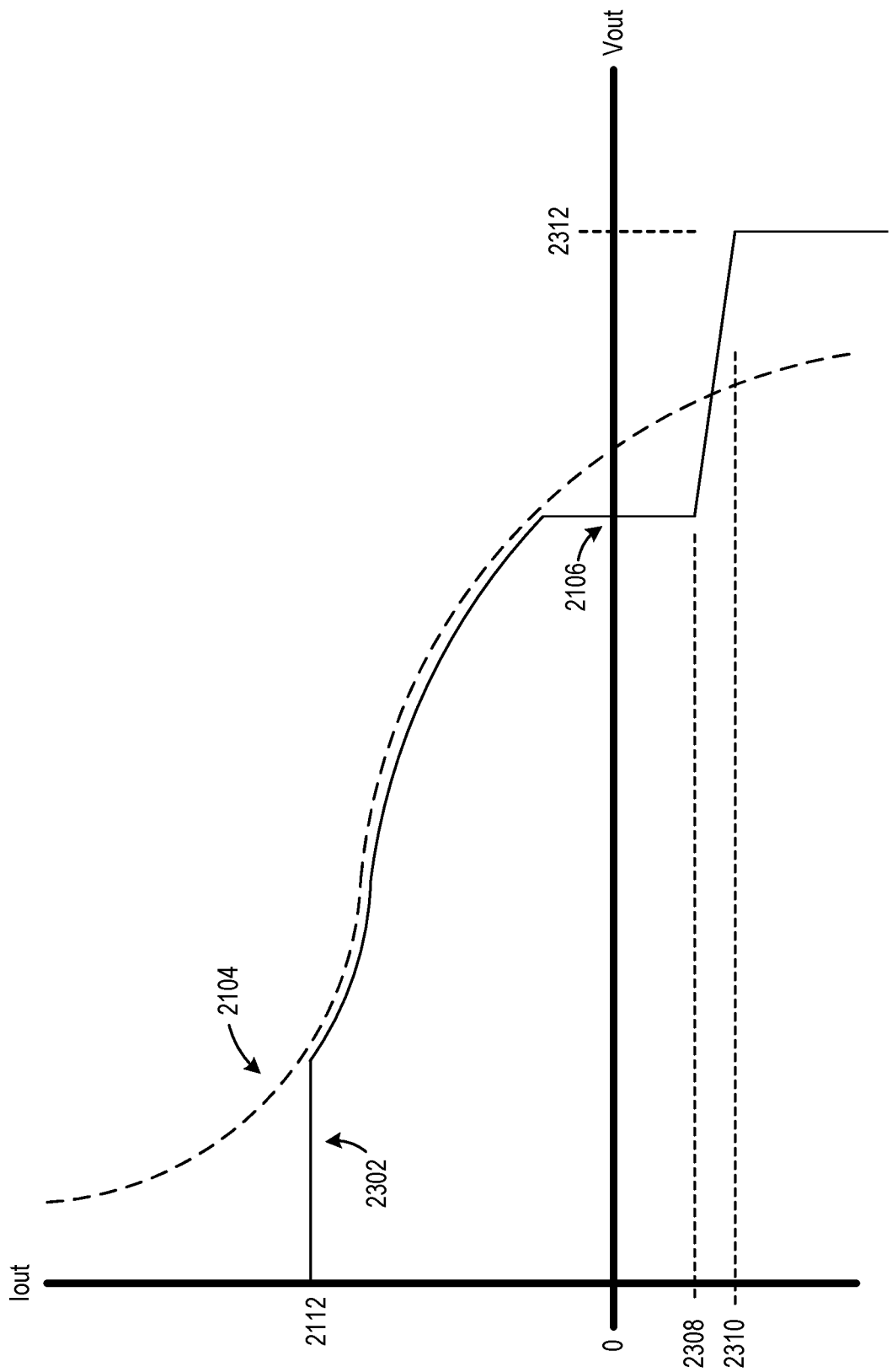
FIG. 23 illustrates an exemplary output current-voltage curve of an embodiment of the FIG. 3 switching circuit like that illustrated in FIG. 21, but having a maximum voltage value that is a large fixed value in the reverse current operating mode, according to an embodiment.

In some other embodiments, the maximum voltage value is set to a relatively large fixed value in the reverse current operating mode. For example, in a particular embodiment, reverse current submodule 516 substantially increases the maximum voltage value from its most-recent value in the voltage limiting operating mode to a higher fixed value in the reverse current operating mode. For instance, FIG. 23 is an exemplary output current-voltage curve 2302 illustrating one example of an embodiment having a fixed maximum voltage value in the reverse current operating mode. Switching circuit 206 enters the reverse current operating mode at threshold 2308, and output voltage $V_{out}$ linearly increases in proportion to absolute value of output current $I_{out}$ until output current $I_{out}$ reaches threshold 2310. Output voltage $V_{out}$ remains at a fixed maximum value 2312 as absolute value of output current $I_{out}$ increases beyond threshold value 2310 in the reverse current operating mode. It should be noted that output voltage $V_{out}$ may be greater than input voltage $V_{in}$ in the reverse current operating mode, thereby achieving a greater stand-off capability than embodiments where $V_{out}$ is limited to $V_{in}$. The fact that $V_{out}$ can be either smaller or larger than $V_{in}$, depending on operating mode and operating conditions, necessitates that switching circuit 206 have a buck-boost-type topology, in the FIG. 23 embodiment.

Disable submodule 518 supports the disable operating mode of switching circuit 206. In particular, disable submodule 518 commands switching control submodule 506 to control switching of control switching device 214 to reduce or eliminate availability of power from energy producing device 210 at output port 208, in the disable operating mode. Operating mode submodule 508 causes switching circuit 206 to enter its disable operating mode, for example, in response to an external signal, such as a signal from a master controller (not shown) within electric power system 200, or a signal generated external to electric power system 200. The disable operating mode is used, for example, during installation, inspection, or maintenance of electric power system 200, to limit power availability in electric power system 200. The disable operating mode may also be used to limit power availability in electric power system 200 in an emergency situation. Disable submodule 518 is further capable of commanding switching control submodule 506 to control switching of control switching device 214 to increase availability of power from energy producing device 210 at output port 208, in response to operating mode submodule 508 causing switching circuit 206 to exit its disable operating mode.

The disable operating mode is characterized by disable submodule 518 commanding switching control submodule 506 to cause control switching device 214 to switch in a manner which reduces or eliminates availability of power from energy producing device 210 at output port 208. In some embodiments, disable submodule 518 completely eliminates the availability of power from energy producing device 210 at output port 208, such as by causing control switching device 214 to continuously operate in its non-conductive state and by causing freewheeling switching device 216 to continuously operate in its conductive state. In some other embodiments, however, disable submodule 518 reduces the availability of power from energy producing device 210 at output port 208 to a non-zero value, such as by limiting duty cycle or frequency of control switching device 214, to minimize the possibility of electric shock while still providing limited power for use in electric power system 200, for instance.

Figure 24:
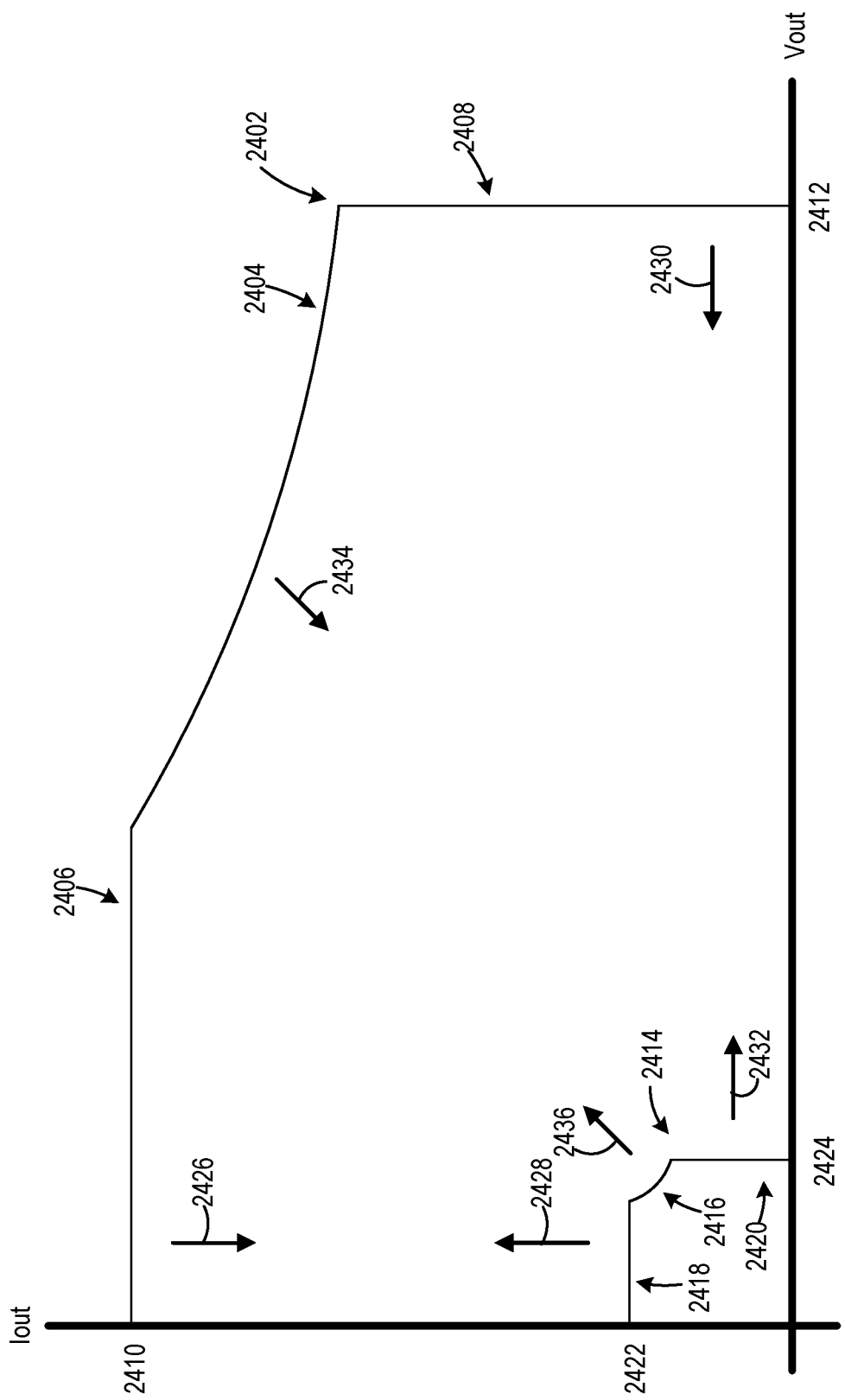
FIG. 24 illustrates current-voltage curves of an embodiment of the FIG. 3 switching circuit where power available at the output port is reduced to a non-zero value in a disable operating mode of the switching circuit, according to an embodiment.

For example, FIG. 24 illustrates current-voltage curves in an embodiment of switching circuit 206 where disable submodule 518 reduces availability of power at output port 208 to a non-zero value. Curve 2402 corresponds to switching circuit 206 operating outside of its disable operating mode and includes three segments 2404, 2406, and 2408. Segment 2404 corresponds to maximum power operation where power available at output port 208 is limited by that available from energy producing device 210. Segment 2406 corresponds to maximum current operation where output current $I_{out}$ is limited to maximum value 2410. Segment 2408 corresponds to maximum voltage operation where output voltage $V_{out}$ is limited to maximum value 2412.

Curve 2414, on the other hand, corresponds to switching circuit 206 operating in its disabled operating mode and includes three segments 2416, 2418, and 2420. As can be appreciated from FIG. 24, some power is still available at output port 208 in the disable operating mode. Segment 2416 corresponds to maximum power operation where power available at output port 208 is limited to a predetermined level represented by segment 2416. Segment 2418 corresponds to maximum current operation where output current $I_{out}$ is limited to maximum value 2422. Segment 2420 corresponds to maximum voltage operation where output voltage $V_{out}$ is limited to maximum value 2424. It should be noted that the characteristics of maximum power segment 2416 are a function of maximum values 2422 and 2424. For example, increasing maximum value 2422 or maximum value 2424 will increase the length of maximum power segment 2416, while decreasing maximum value 2422 or maximum value 2424 will decrease the length of maximum power segment 2416. Furthermore, maximum value 2422 or 2424 could be significantly decreased so that segment 2416 becomes a single point.

Disable submodule 518 causes switching circuit 206 to enter the disable operating mode, for example, by commanding current limiting submodule 512 to reduce the maximum current value to value 2422, as indicated by arrow 2426, thereby limiting magnitude of output current $I_{out}$ to value 2422. In these embodiments, disable submodule 518 causes switching circuit 206 to exit the disable operating mode by commanding current limiting submodule 512 to increase the maximum current value to value 2410, as indicated by arrow 2428, thereby allowing output current $I_{out}$ to reach value 2410. The transition between maximum current values 2410 and 2422 occurs, for example, at a linear ramp rate, a non-linear ramp rate, or a discrete stepping pattern which is chosen to achieve an acceptable compromise between minimizing transient disturbances in electric power system 200 and realizing quick transition into and out of the disable operating mode. For instance, the transition from maximum current value 2422 to maximum current value 2410 could be controlled by limiting peak value of output current $I_{out}$ during the transition, such as on a pulse-by-pulse basis, using techniques similar to those disclosed in U.S. Pat. No. 8,044,648 to Kahn et al., which is incorporated herein by reference.

In some other embodiments, disable submodule 518 causes switching circuit 206 to enter the disable operating mode by commanding voltage limiting submodule 514 to reduce the maximum voltage value to value 1224, as indicated by arrow 1230, thereby limiting magnitude of output voltage $V_{out}$ to value 1224. In these embodiments, disable submodule 518 causes switching circuit 206 to exit the disable operating mode by commanding voltage limiting submodule 514 to increase the maximum voltage value to value 2412, as indicated by arrow 2432, thereby allowing output voltage $V_{out}$ to reach value 2412. The transition between maximum voltage values 2412 and 2424 occurs, for example, at a linear ramp rate, a non-linear ramp rate, or a discrete stepping pattern which is chosen to achieve an acceptable compromise between minimizing transient disturbances in electric power system 200 and realizing quick transition into and out of the disable operating mode. As discussed below, rate of decrease of output voltage $V_{out}$ is potentially affected by output current $I_{out}$, as well as by the maximum voltage value commanded by voltage limiting submodule 514.

In yet other embodiments, disable submodule 518 controls available power at output port 208, i.e. the product of output current $I_{out}$ and output voltage $V_{out}$, to transition into and out of the disable operating mode. In these embodiments, disable submodule 518 causes switching circuit 206 to enter the disable operating mode by commanding both current limiting submodule 512 and voltage limiting submodule 514 to reduce power available at output port 208 to that represented by segment 2416, as indicated by arrow 2434. In these embodiments, disable submodule 518 causes switching circuit 206 to exit the disable operating mode by commanding both current limiting submodule 512 and voltage limiting submodule 514 to increase power available at output port 208 to that represented by segment 2404, as indicated by arrow 2436. The transition between available power levels at output port 208 occurs, for example, at a linear ramp rate, a non-linear ramp rate, or a discrete stepping pattern which is chosen to achieve an acceptable compromise between minimizing transient disturbances in electric power system 200 and realizing quick transition into and out of the disable operating mode.

Switching circuit 206 may experience a reverse current condition when operating in its disable operating mode, such as due to operation of other switching circuit 206 instances which are not operating in their disable mode. Therefore, in certain embodiments, operating control module 508 causes switching circuit 206 to transition to its reverse current operating mode in response to occurrence of a reverse current condition while in the disable operating mode. In such case, reverse current submodule 516 operates in a manner similar to that discussed above to increase the maximum voltage value from its most recent value in the disable operating mode to a higher value, such that output voltage $V_{out}$ is allowed to rise and track input voltage $V_{in}$. Thus, switching from the disable operating mode to the reverse current operating mode helps prevent strings 202 from conducting reverse current.

Figure 25:
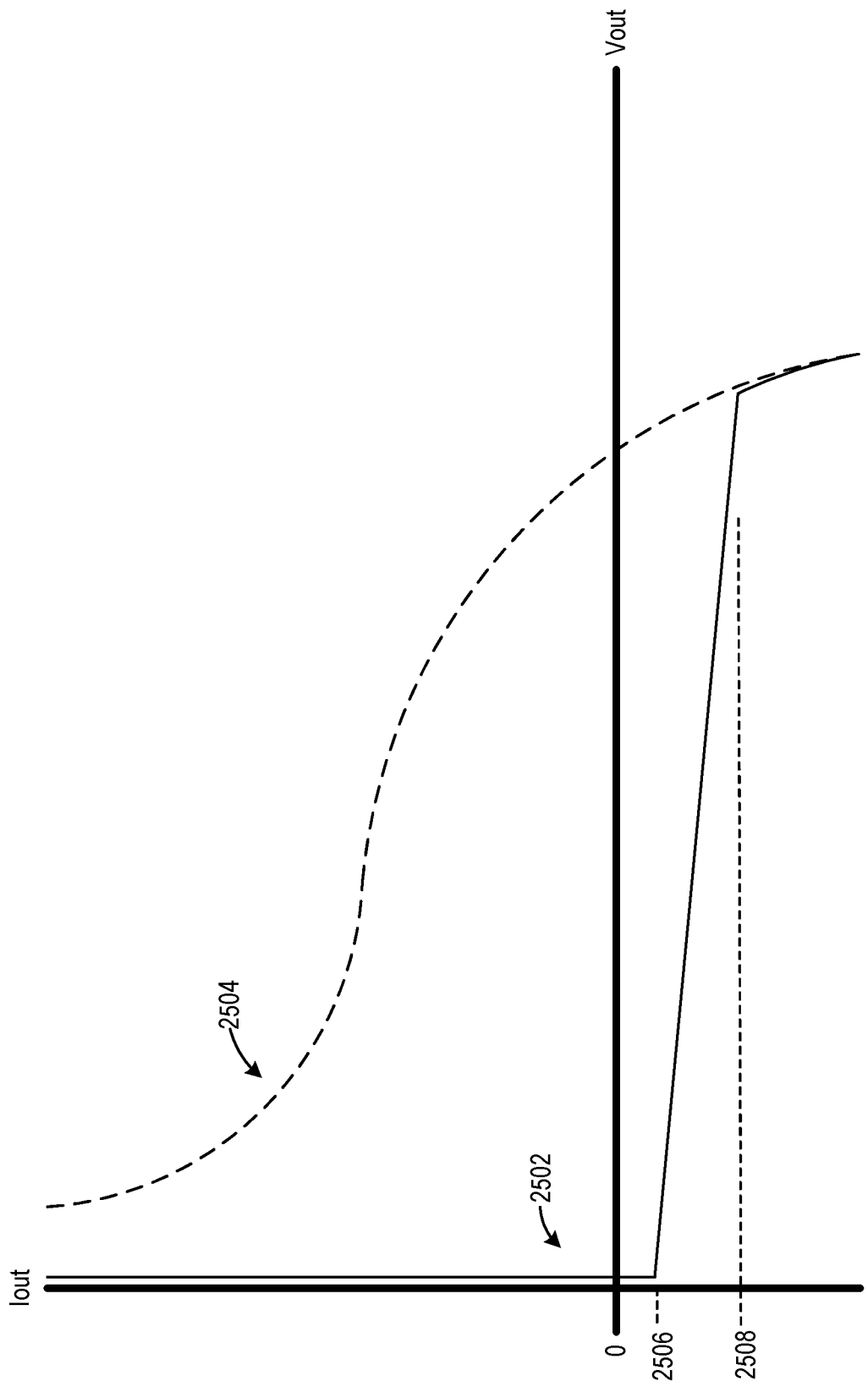
FIG. 25 illustrates an exemplary current-voltage curve of an embodiment of the FIG. 3 switching circuit supporting entry into a reverse current operating mode from a disable operating mode, according to an embodiment.

FIG. 25 is an exemplary current-voltage curve 2502 illustrating one example of switching circuit 206 implementing both the disable operating mode and the reverse current operating mode. Curve 2504, shown in dashed lines, illustrates the current-voltage curve of energy producing device 210 when the energy producing device is a photovoltaic device. In this example, disable submodule 518 causes output voltage $V_{out}$ to be essentially zero in the disable operating mode, irrespective of magnitude of positive output current $I_{out}$. However, when output current $I_{out}$, as determined by current sensing submodule 502, falls below threshold value 2506, which represents a reverse current condition, operating mode submodule 508 causes switching circuit 206 to switch from its voltage limiting operating mode to its reverse current operating mode. Reverse current submodule 516 increases the maximum voltage value in the reverse current operating mode in proportion to absolute magnitude of output current $I_{out}$. Consequently, output voltage $V_{out}$ increases as absolute value of output current $I_{out}$ magnitude increases. Output voltage $V_{out}$ tracks input voltage $V_{in}$ once absolute value of output current $I_{out}$ magnitude reaches threshold 2508. Although FIG. 25 illustrates the relationship between the maximum voltage value and output current $I_{out}$ between thresholds 2506 and 2508 as being linear, the maximum voltage value could have a different relationship, such as a hysteretic relationship, with output current $I_{out}$. Additionally, output voltage $V_{out}$ could alternately linearly increase to a fixed maximum value in the reverse current operating mode, where the fixed maximum value is higher or lower than input voltage $V_{in}$.

Figure 26:
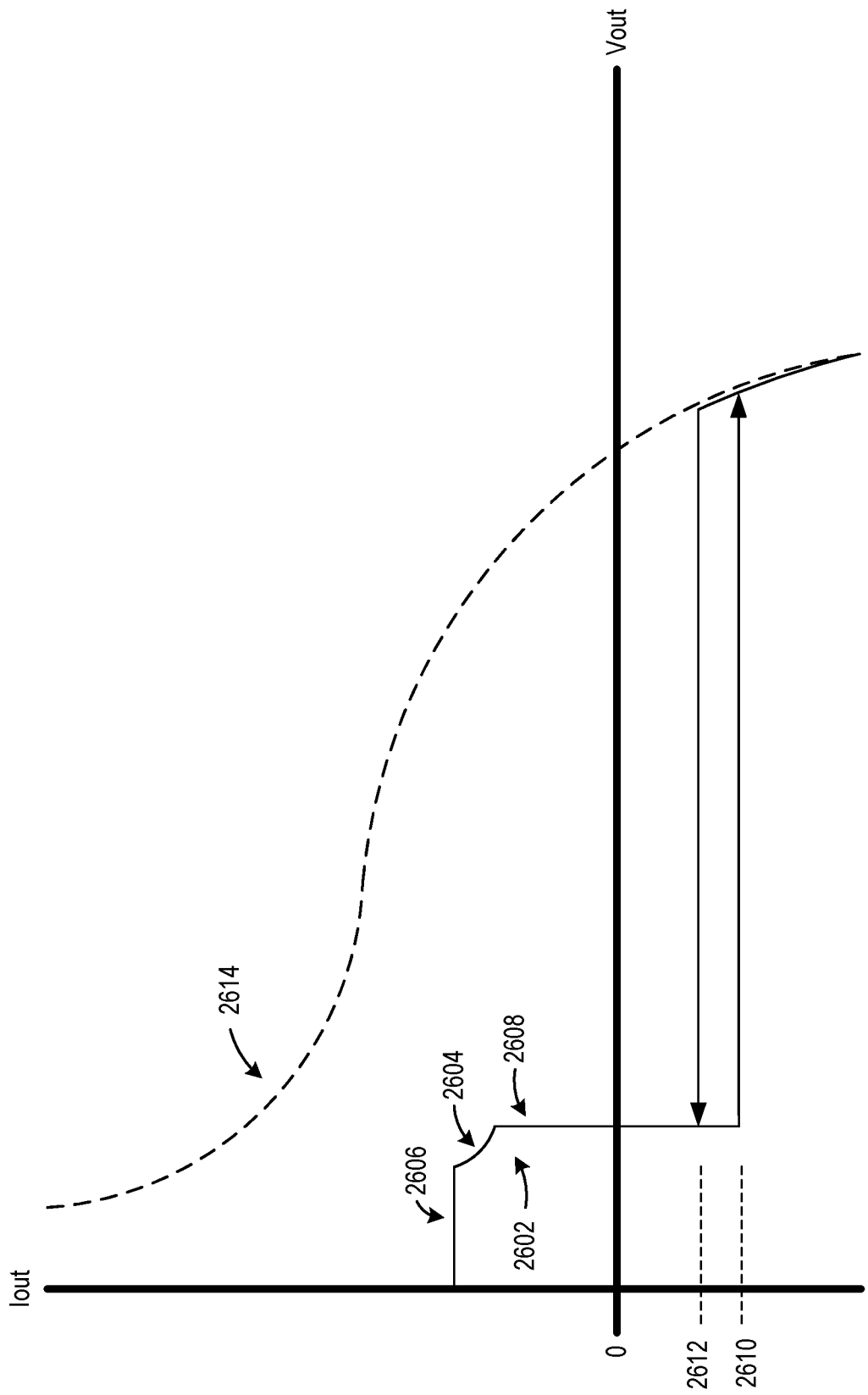
FIG. 26 illustrates an exemplary current-voltage curve of another embodiment of the FIG. 3 switching circuit supporting entry into a reverse current operating mode from a disable operating mode, according to an embodiment.

FIG. 26 is an exemplary current-voltage curve 2602 illustrating another example of switching from the disable operating mode to the reverse current operating mode. In this example, switching circuit 206 reduces power available at output port 208 to a non-zero value in the disable operating mode, represented by segments 2604, 2606, and 2608, in a manner similar to that discussed above with respect to FIG. 24. However, when output current $I_{out}$, as determined by current sensing submodule 502, drops below threshold value 2610, reverse current submodule 516 increases the magnitude of output voltage $V_{out}$ in a hysteretic manner, so that output voltage $V_{out}$ tracks input voltage $V_{in}$. On the other hand, when magnitude of output current $I_{out}$ rises above threshold value 2612, switching circuit 206 returns to its disable operating mode. Curve 2614, shown in dashed lines, illustrates the current-voltage curve of an alternate embodiment not supporting the voltage limiting operating mode.

In certain embodiments, the disable operating mode is at least partially characterized by reducing the maximum voltage value, such as from value 2412 to value 2424 as discussed above respect to FIG. 24. While reducing the maximum voltage value reduces the maximum commanded value of output voltage $V_{out}$, the output voltage may not actually decrease unless switching circuit 206 sinks current, or in words, supplies negative or reverse current $I_{out}$. In particular, there may be significant capacitance across output port 208, such as capacitance of load 204, which may need to be discharged by switching circuit 206 to reduce output voltage $V_{out}$. The magnitude of such negative or reverse current could be very large if output voltage $V_{out}$ is allowed to decrease in an uncontrolled manner.

Applicant has discovered, however, that the reverse current operating mode can advantageously help limit magnitude of reverse current when reducing output voltage $V_{out}$, such as when entering the disable operating mode. Consider, for example, FIG. 27, which is like FIG. 25, but further includes an exemplary current-voltage curve 2710 illustrating operation outside of the disable operating mode. Assume that switching circuit 206 is operating in its MPPT operating mode at point 2712 on curve 2710. Now assume that switching circuit 206 is commanded to transition to its disable operating mode and that significant capacitance across output port 208 must be discharged. Switching circuit 206's operating point will move to point 2714 on reverse current curve 2716, as indicated by arrow 2720, to discharge the capacitance. Operation will then continue along reverse current curve 2716 in the direction indicated by arrow 2722 until reaching threshold 2506 where output voltage $V_{out}$ is essentially zero.

Figure 27:
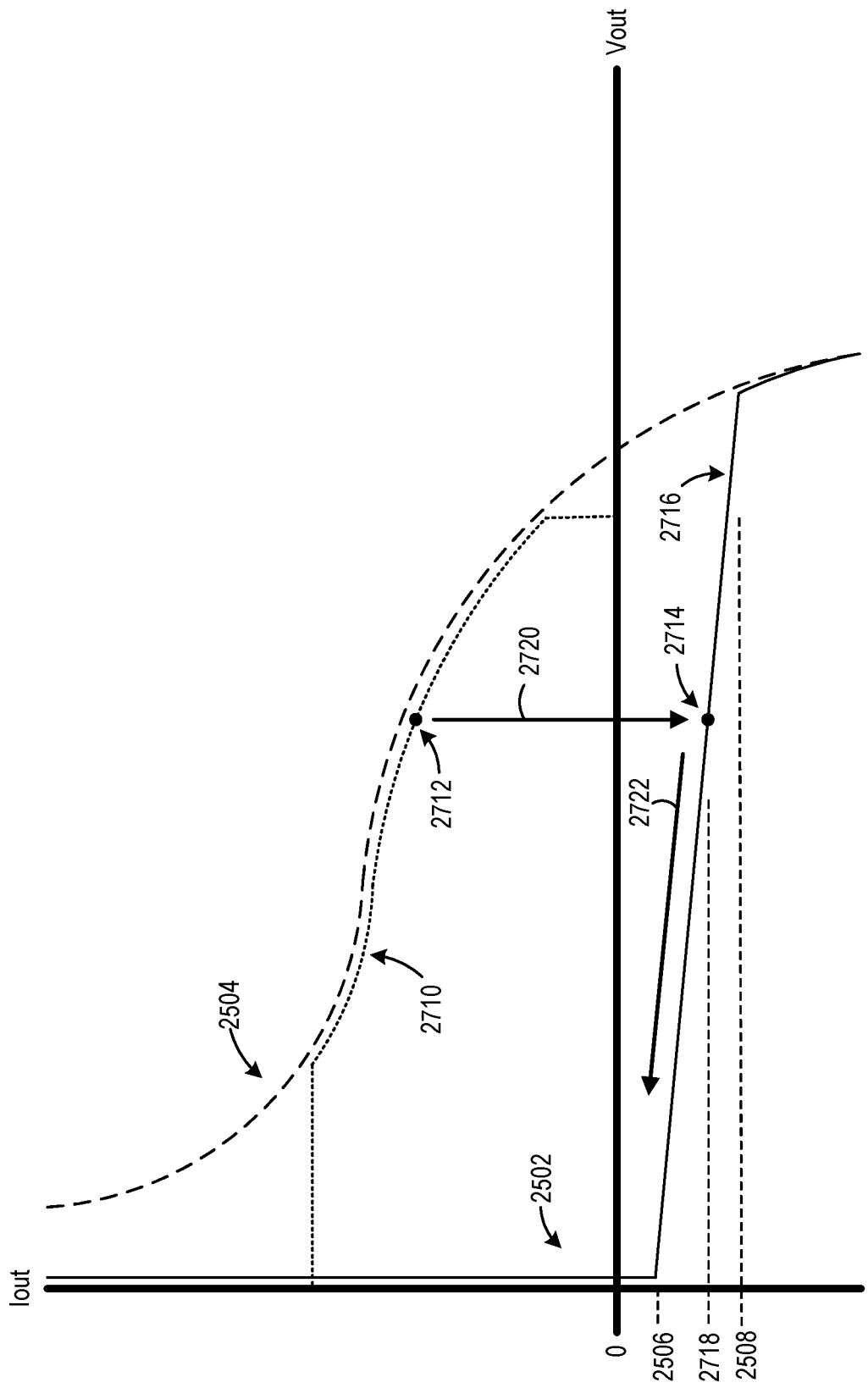
FIG. 27 illustrates transition from an MPPT operating mode to a disable operating mode in an embodiment of the FIG. 3 switching circuit supporting a reverse current operating mode, according to an embodiment.

It should be appreciated that support of the reverse current operating mode in the FIG. 27 scenario allows output voltage $V_{out}$ to decrease in a controlled manner, with reverse current limited to value 2718 by reverse current curve 2716. If the reverse current operating mode were not supported, magnitude of reverse current would be much greater than that of value 2718 when transitioning into the disable operating mode. Similar benefits may be achieved by supporting the reverse current operating mode in embodiments where available output power is non-zero in the disable operating mode, such as in a scenario like that of FIG. 24.

Figure 28:
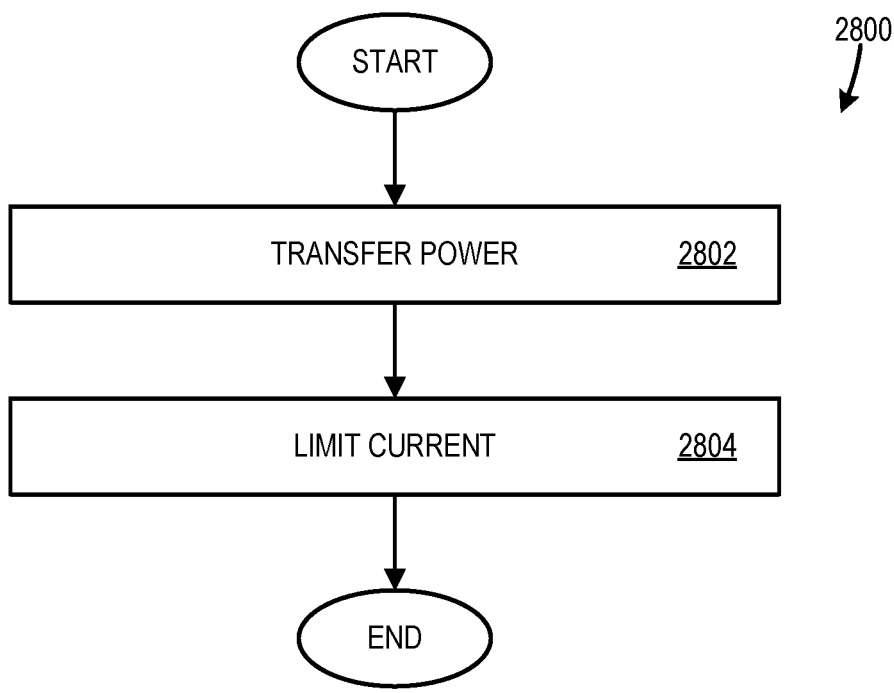
FIG. 28 illustrates a method for controlling a switching circuit, according to an embodiment.

FIG. 28 illustrates a method 2800 for controlling a switching circuit including an import port electrically coupled to an energy producing device and an output port electrically coupled to a load. In step 2802, the switching circuit operates in a first operating mode, and a first switching device is caused to repeatedly switch between its conductive and non-conductive states to transfer power from the energy producing device to the load. In one example of step 2802, MPPT submodule 510 commands switching control submodule 506 to cause control switching device 214 to switch such that power transferred from energy producing device 210 to load 204 is maximized. (See FIGS. 3 and 5). In step 2804, the switching circuit operates in a current limiting operating mode, and the first switching device is caused to repeatedly switch between its conductive and non-conductive states to limit output current of the switching circuit to a maximum current value. In one example of step 2804, current limiting submodule 512 commands switching control submodule 506 to cause control switching device 214 to switch such that output current $I_{out}$ flowing through output port 208 is limited to a maximum current value.

Figure 29:
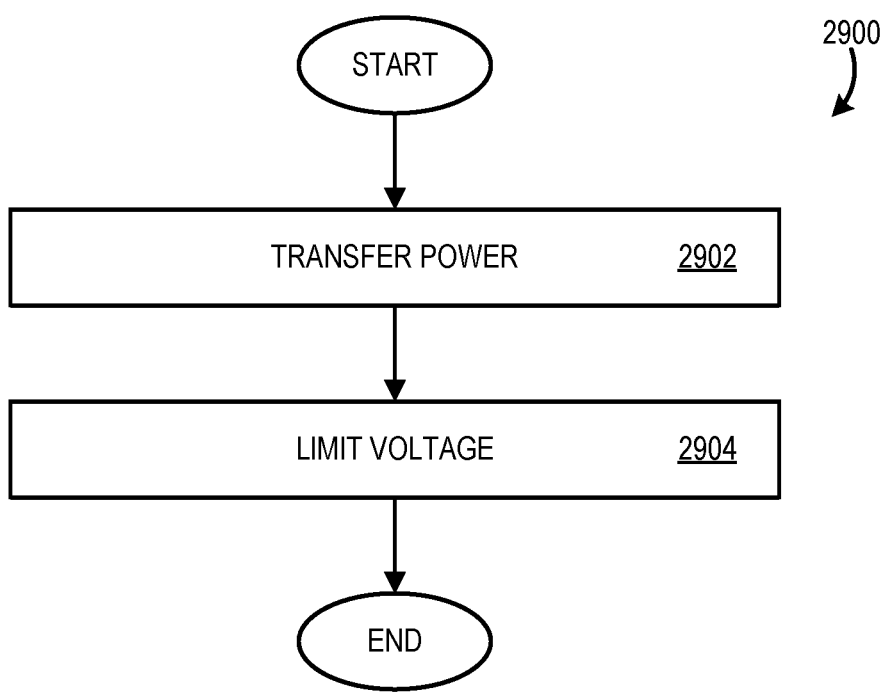
FIG. 29 illustrates another method for controlling a switching circuit, according to an embodiment.

FIG. 29 illustrates a method 2900 for controlling a switching circuit including an import port electrically coupled to an energy producing device and an output port electrically coupled to a load. In step 2902, the switching circuit operates in a first operating mode, and a first switching device is caused to repeatedly switch between its conductive and non-conductive states to transfer power from the energy producing device to the load. In one example of step 2902, MPPT submodule 510 commands switching control submodule 506 to cause control switching device 214 to switch such that power transferred from energy producing device 210 to load 204 is maximized. (See FIGS. 3 and 5). In step 2904, the switching circuit operates in a voltage limiting operating mode, and a first switching device is caused to repeatedly switch between its conductive and non-conductive states to limit output voltage of the switching circuit to a maximum voltage value. In one example of step 2904, voltage limiting submodule 514 commands switching control submodule 506 to cause control switching device 214 to switch such that output voltage $V_{out}$ across port 208 is limited to a maximum voltage value.

Figure 30:
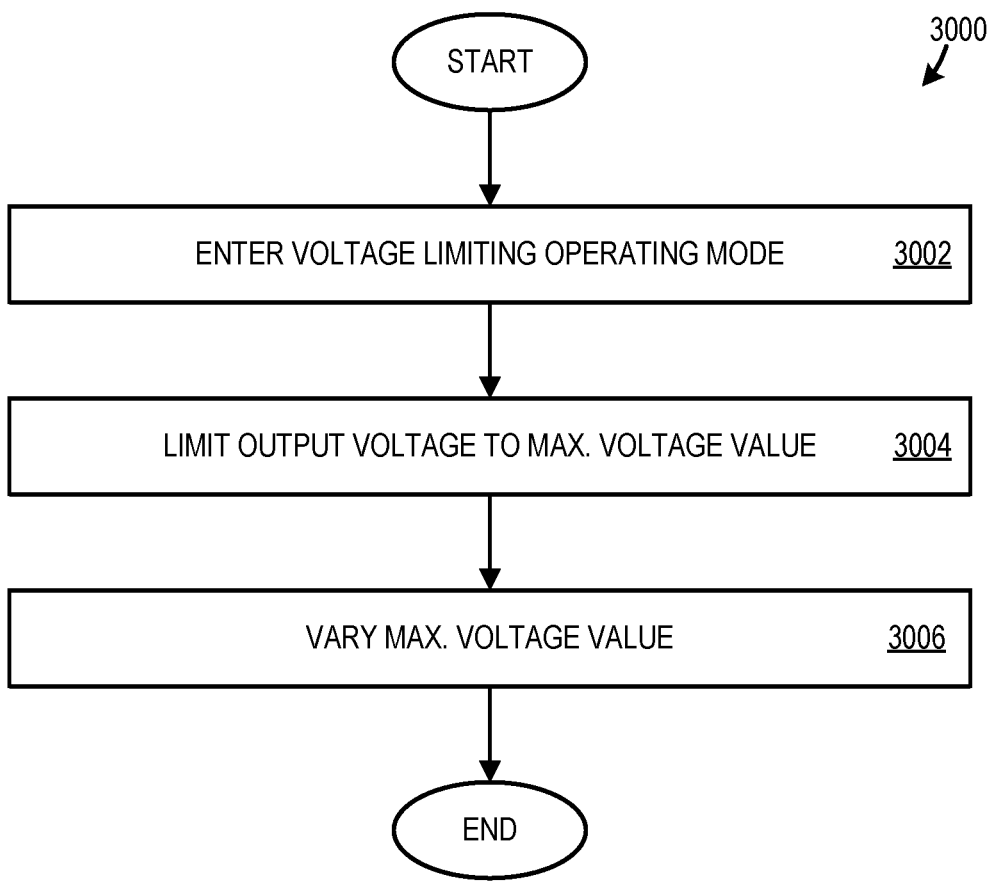
FIG. 30 illustrates another method for controlling a switching circuit, according to an embodiment.

FIG. 30 illustrates a method 3000 for controlling a switching circuit including an input port electrically coupled to a photovoltaic device and an output port electrically coupled to a load. In step 3002, the switching circuit enters a voltage limiting operating mode. In one example of step 3002, operating mode submodule 508 causes switching circuit 206 to enter its voltage limiting operating mode in response to voltage $V_{out}$ across output port 208 reaching a threshold value. (See FIGS. 3 and 5). In step 3004, a control switching device of the switching circuit is caused to repeatedly switch between its conductive and non-conductive states in a manner which limits magnitude of an output voltage to a maximum voltage value, where the output voltage is a voltage across the output port. In one example of step 3004, voltage limiting submodule 514 commands switching control submodule 506 to cause control switching device 214 to switch such that output voltage $V_{out}$ across output port 208 is limited to a maximum voltage value. In step 3006, the maximum voltage value is varied as a function of magnitude of an output current, where the output current is a current flowing through the output port. In one example of step 3006, voltage limiting submodule 514 varies the maximum voltage value according to current $I_{out}$ flowing through output port 208, such as illustrated in FIG. 12, 14, or 15.

Figure 31:
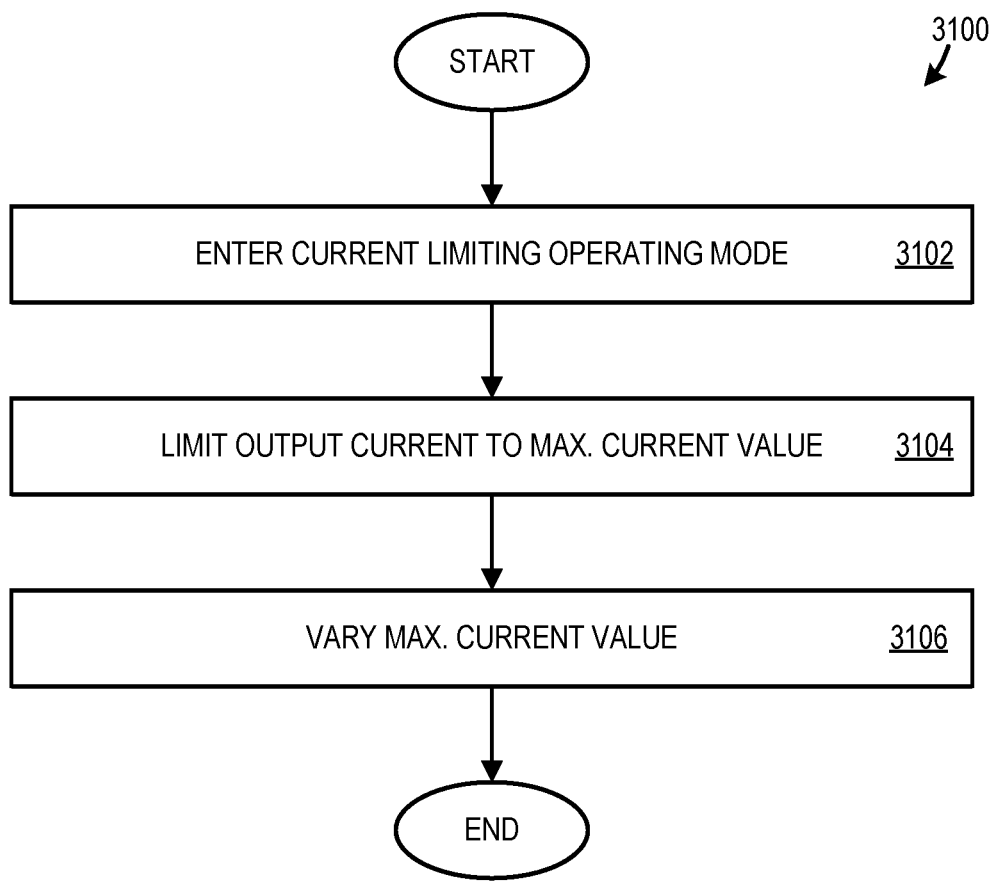
FIG. 31 illustrates yet another method for controlling a switching circuit, according to an embodiment.

FIG. 31 illustrates a method 3100 for controlling a switching circuit including an input port electrically coupled to an energy producing device and an output port electrically coupled to a load. In step 3102, the switching circuit enters a current limiting operating mode. In one example of step 3102, operating mode submodule 508 causes switching circuit 206 to enter its current limiting operating mode in response to current $I_{out}$ flowing through output port 208 reaching a threshold value. (See FIGS. 3 and 5). In step 3104, a control switching device of the switching circuit is caused to repeatedly switch between its conductive and non-conductive states in a manner which limits magnitude of an output current to a maximum current value, where the output current is a current flowing through the output port. In one example of step 3104, current limiting submodule 512 commands switching control submodule 506 to cause control switching device 214 to switch such that output current $I_{out}$ flowing through output port 208 is limited to a maximum current value. In step 3106, the maximum current value is varied as a function of magnitude of an output voltage, where the output voltage is a voltage across the output port. In one example of step 3106, current limiting submodule 512 varies the maximum current value according to voltage $V_{out}$ across output port 208, such as illustrated in FIG. 7 or 8.

Figure 32:
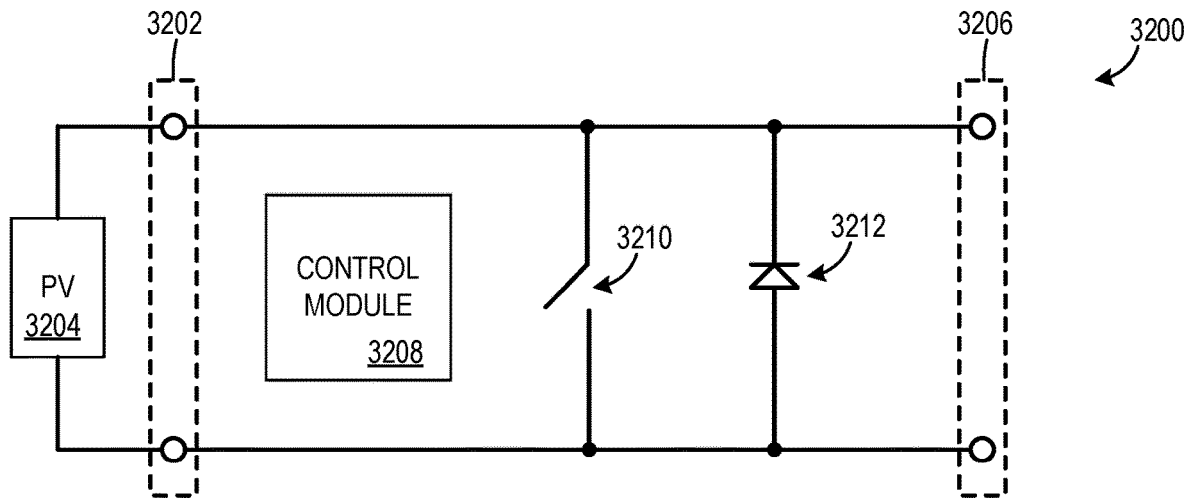
FIG. 32 illustrates an operating mode control device for a photovoltaic device, according to an embodiment.
Figure 33:
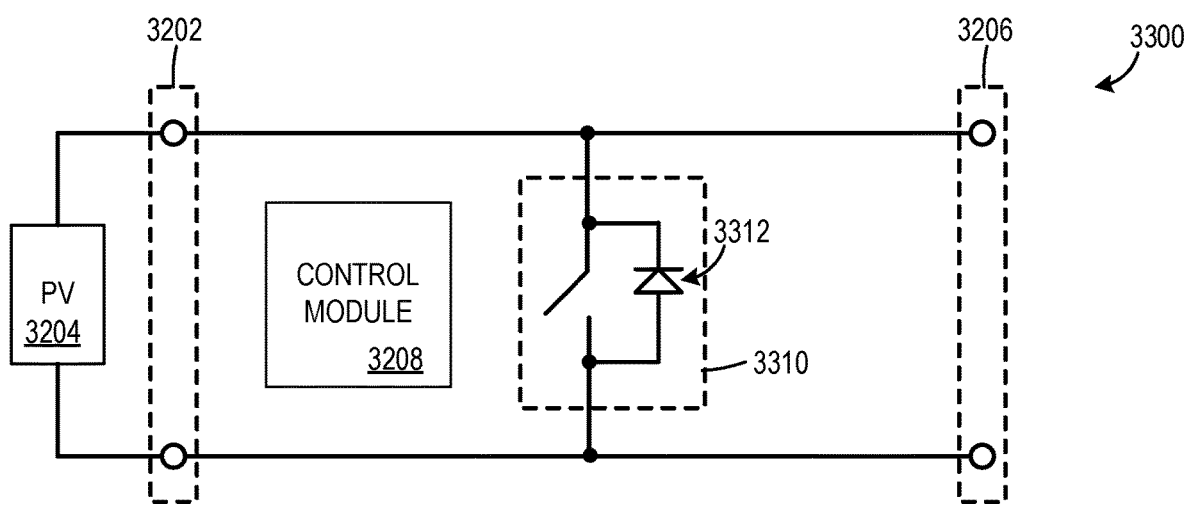
FIG. 33 illustrates an operating mode control device similar to that of FIG. 32, but including a single transistor in place of a switching device and a diode of the FIG. 32 operating mode control device, according to an embodiment.
Figure 34:
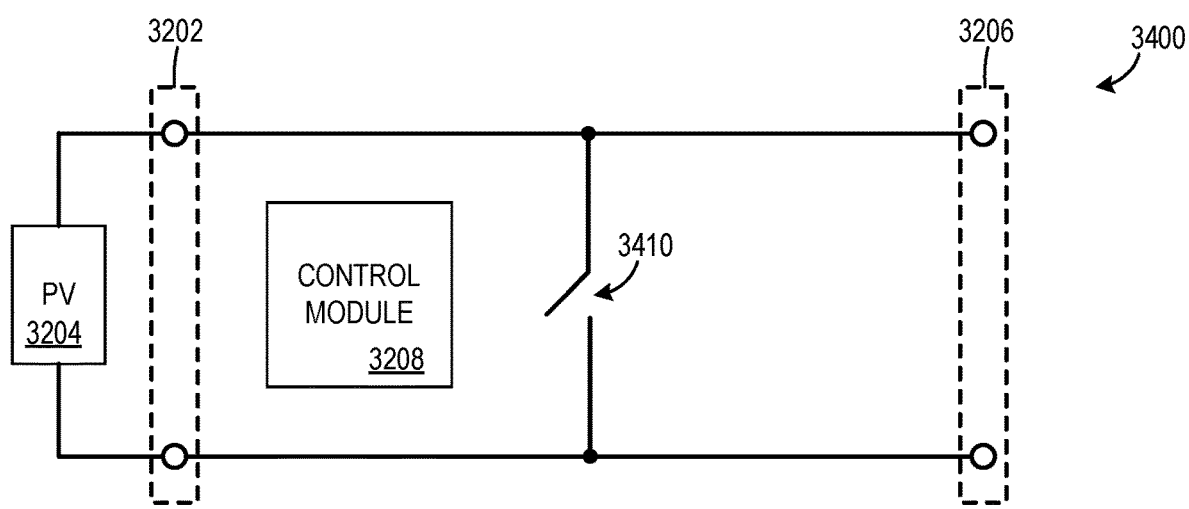
FIG. 34 illustrates an operating mode control device similar to that of FIG. 32, but including a single switching device in place of the switching device and the diode of the FIG. 32 operating mode control device, according to an embodiment.

FIGS. 32-34 illustrate alternative energy coupling devices for controlling operating mode of a photovoltaic device. Use of the devices of FIG. 32-34, instead of switching circuit 206, as an energy coupling device may be desirable in cost-sensitive applications which merely require the ability to disable and bypass a photovoltaic device, such as in applications where MPPT, voltage limiting, current limiting, and low-power disabling capability are not required.

FIG. 32 illustrates an operating mode control device 3200 for enabling and disabling a photovoltaic device. Operating mode control device 3200 includes an input port 3202 for electrically coupling to a photovoltaic device 3204, an output port 3206 for electrically coupling to a load, a control module 3208, and a switching device 3210 and a diode 3212 each electrically coupled in parallel with both input port 3202 and output port 3206.

Operating mode control device 3200 has both an enabled and a disabled operating mode. In the enabled operating mode, control module 3208 causes switching device 3210 to continuously operate in its non-conductive state. Current will flow through diode 3212 when current through output port 3206 exceeds a short circuit current of photovoltaic device 3204, thereby shunting current around photovoltaic device 3204 and causing voltage across output port 3206 to be clamped to a negative value sufficiently large for diode 3212 to conduct. In the disabled operating mode, in contrast, control module 3208 causes switching device 3210 to continuously operate in its conductive state, thereby shorting photovoltaic device 3204 and causing no power to be available at output port 3206.

FIG. 33 illustrates an operating mode control device 3300 which is similar to operating mode control device 3200, but where switching device 3210 and diode 3212 are replaced with a single transistor 3310 including a parasitic body diode 3312. FIG. 34 illustrates an operating mode control device 3400 which also is similar to operating mode control device 3200, but where switching device 3210 and diode 3212 are replaced with a single switching device 3410. Control module 3208 controls switching device 3410 in the enabled and disabled operating modes in a manner similar to that discussed above with respect to FIG. 32. Additionally, control module 3208 controls switching device 3410 to emulate diode 3212 when current through output port 3206 exceeds the short circuit current of photovoltaic device 3204, to shunt current around photovoltaic device 3204, in a short circuit operating mode of the operating mode control device. Accordingly, operating mode control device 3400 advantageously achieves the same functionality as operating mode control device 3200 but with fewer components and enhanced reliability associated with using switching device 3410 instead of diodes 3212 or 3312 while in the short circuit operating mode.

Figure 35:
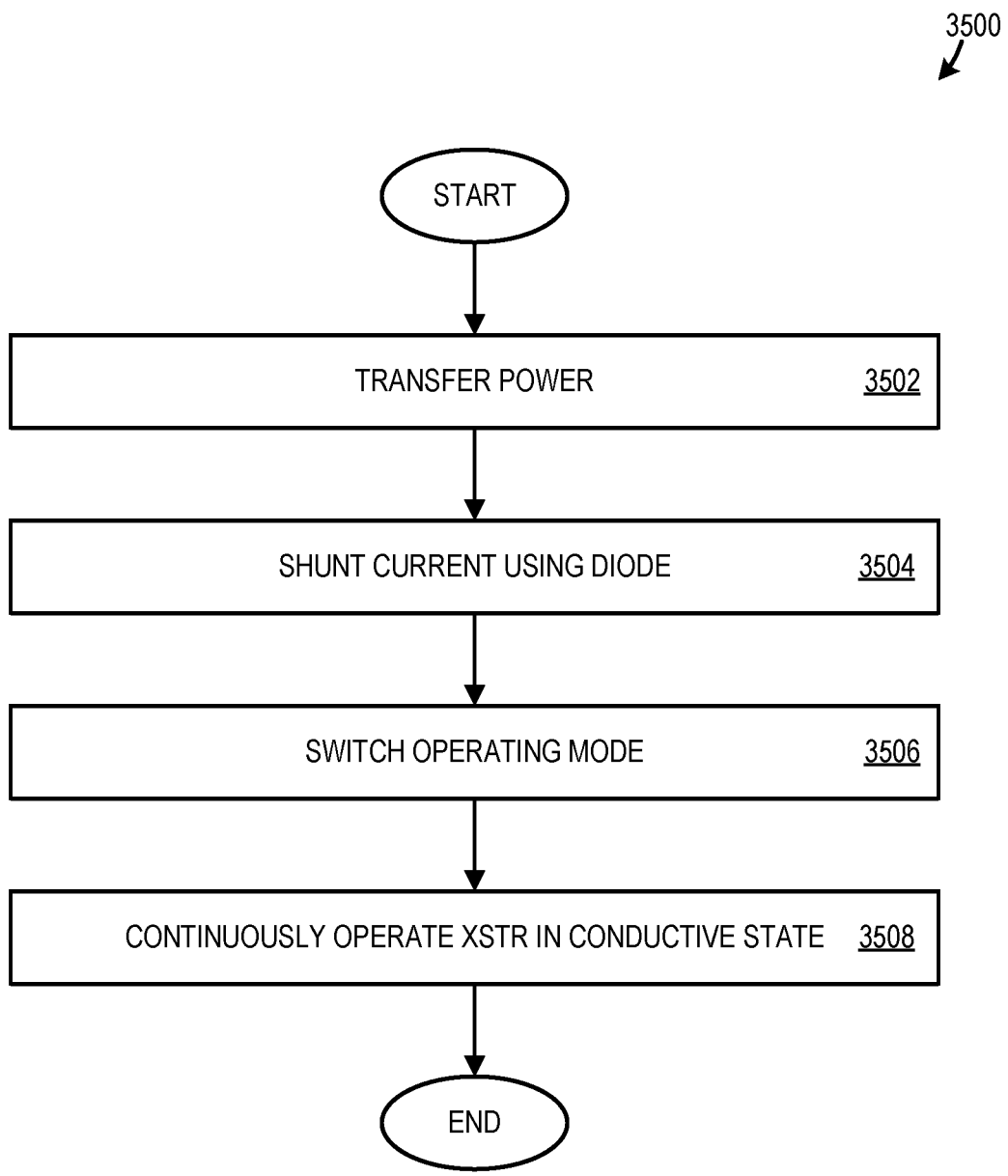
FIG. 35 illustrates a method for controlling an operating mode control device, according to an embodiment.

FIG. 35 illustrates a method for controlling an operating mode control device including an input port electrically coupled to a photovoltaic device and an output port electrically coupled to a load. In step 3502, power is transferred from the photovoltaic device to the load. In one example of step 3502, power is transferred from photovoltaic device 3204 to a load electrically coupled to output port 3206 of operating mode device 3300. (See FIG. 33). In step 3504, current flowing through the output port is shunted around the photovoltaic device using a diode electrically coupled across the output port, when an output port current exceeds a short circuit current of the photovoltaic device. In one example of step 3504, current flowing through output port 3206 is shunt around photovoltaic device 3204 via body diode 3312 of transistor 3310. In step 3506, the operating mode of the operating mode control device is switched from the first operating mode to a disable operating mode. In one example of step 3506, control module 3208 switches the operating mode of operating mode control device 3300 from the first operating mode to a disable operating mode. In step 3508, a transistor electrically coupled across the output port is continuously operated in its conductive state, in the disable operating mode. In one example of step 3508, transistor 3310 is continuously operated in its conductive state, to disable photovoltaic device 3204.

Figure 36:
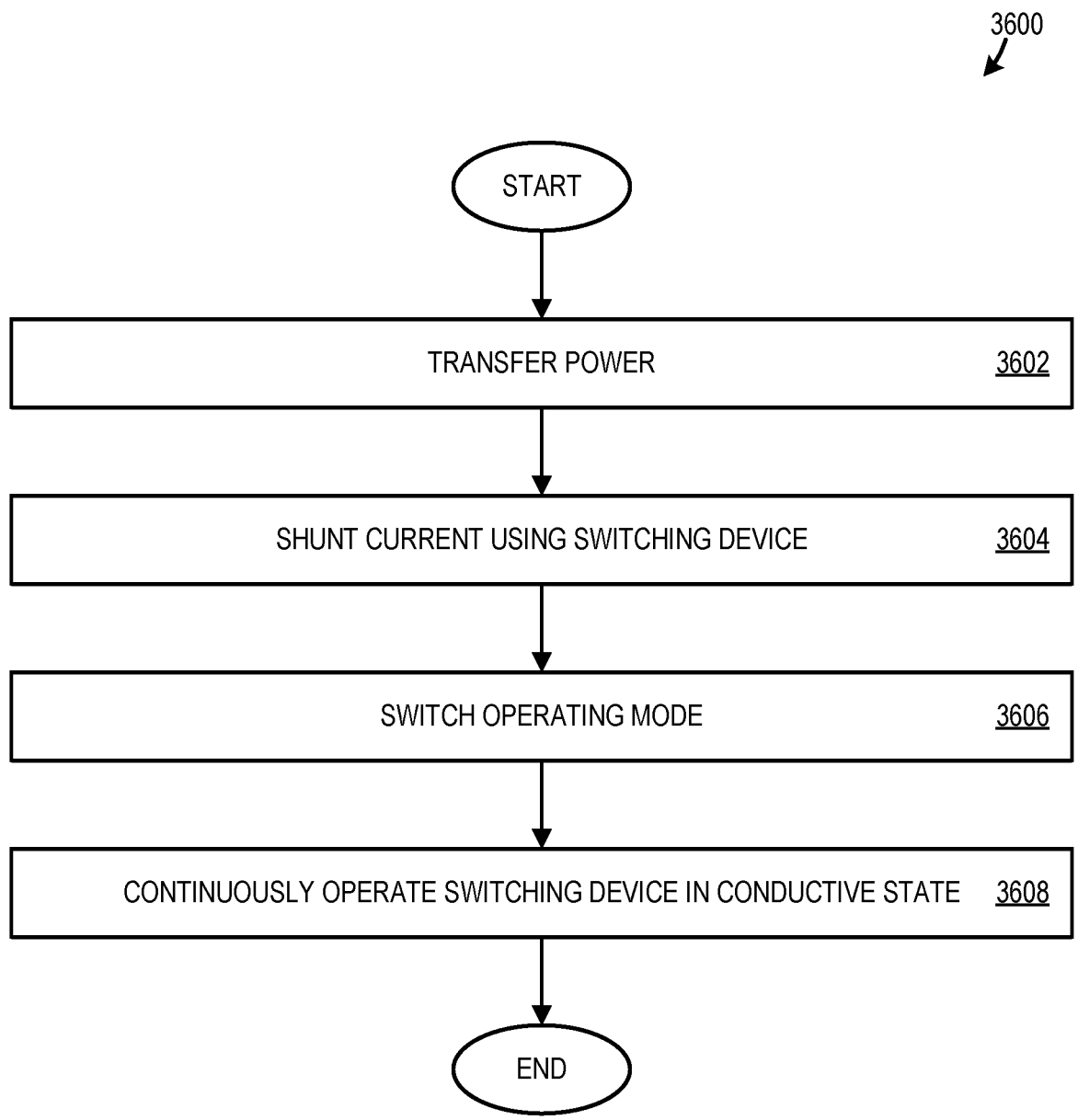
FIG. 36 illustrates another method for controlling an operating mode control device, according to an embodiment.

FIG. 36 illustrates another method for controlling an operating mode control device including an input port electrically coupled to a photovoltaic device and an output port electrically coupled to a load. In step 3602, power is transferred from the photovoltaic device to the load. In one example of step 3602, power is transferred from photovoltaic device 3204 to a load electrically coupled to output port 3206 of operating mode control device 3400. (See FIG. 34). In step 3604, current flowing through the output port is shunted around the photovoltaic device using a switching device electrically coupled across the output port, when an output port current exceeds a short circuit current of the photovoltaic device. In one example of step 3604, current flowing through output port 3206 is shunted around photovoltaic device 3204 via switching device 3410. In step 3606, the operating mode of the operating mode control device is switched from the first operating mode to a disable operating mode. In one example of step 3606, control module 3208 switches the operating mode of operating mode control device 3400 from the first operating mode to a disable operating mode. In step 3608, the switching device electrically coupled across the output port is continuously operated in its conductive state, in the disable operating mode. In one example of step 3608, switching device 3410 is continuously operated in conductive state, to disable photovoltaic device 3204.

Combinations of Features

Features described above may be combined in various ways without departing from the scope hereof. The following examples illustrate some possible combinations:

(A1) A method for controlling a switching circuit including an input port electrically coupled to a photovoltaic device and an output port electrically coupled to a load may include the following steps: (1) entering a voltage limiting operating mode, and (2) in the voltage limiting operating mode: (a) causing a control switching device of the switching circuit to repeatedly switch between its conductive and non-conductive states in a manner which limits magnitude of an output voltage to a maximum voltage value, the output voltage being a voltage across the output port, and (b) varying the maximum voltage value as a function of magnitude of an output current, the output current being a current flowing through the output port.

(A2) The method denoted as (A1) may further include, before the step of the entering the voltage limiting operating mode, causing the control switching device to repeatedly switch between its conductive and non-conductive states in a manner which maximizes power transferred from the photovoltaic device to the load.

(A3) Either of the methods denoted as (A1) or (A2) may further include, in the voltage limiting operating mode, causing the control switching device to repeatedly switch between its conductive and non-conductive states such that a ratio of change in the output voltage over a change in the output current is a finite value.

(A4) Either of the methods denoted as (A1) or (A2) may further include, in the voltage limiting operating mode, varying the maximum voltage value as a hysteretic function of magnitude of the output current.

(A5) Any of the methods denoted as (A1) through (A4) may include further include: (1) switching operating mode of the switching circuit from the voltage limiting operating mode to a reverse current operating mode, and (2) in the reverse current operating mode: (a) increasing the maximum voltage value, and (b) controlling switching of the control switching device such that magnitude of the output voltage is limited to the maximum voltage value.

(A6) The method denoted as (A5) may further include switching operating mode of the switching circuit from the voltage limiting operating mode to the reverse current operating mode in response to one or more of (a) magnitude of the output current falling below a first threshold value, and (b) a change in polarity of the output current.

(A7) Either of the methods denoted as (A5) or (A6) may further include varying the maximum voltage value as a function of absolute value of magnitude of the output current, in the reverse current operating mode.

(A8) Either of the methods denoted as (A5) or (A6) may further include varying the maximum voltage value as a hysteretic function of magnitude of the output current, in the reverse current operating mode.

(A9) Either of the methods denoted as (A5) or (A6) may further include allowing the output voltage to track a voltage across the input port, in the reverse current operating mode.

(A10) Any of the methods denoted as (A1) through (A4) may further include: (1) entering a disable operating mode of the switching circuit, and (2) in the disable operating mode: (a) reducing the maximum voltage value, and (b) causing the control switching device to repeatedly switch between its conductive and non-conductive states in a manner which limits magnitude of the output voltage to the maximum voltage value, to reduce availability of power from the photovoltaic device at the output port.

(A11) The method denoted as (A10) may further include, in the disable operating mode: (1) reducing a maximum current value specifying a maximum magnitude of the output current, and (2) causing the control switching device to repeatedly switch between its conductive and non-conductive states in a manner which limits magnitude of the output current to the maximum current value, to reduce availability of power from the photovoltaic device at the output port.

(A12) Either of the methods denoted as (A10) or (A11) may further include: (1) switching operating mode of the switching circuit from the disable operating mode to a reverse current operating mode, and (2) in the reverse current operating mode: (a) increasing the maximum voltage value, and (b) controlling switching of the control switching device such that magnitude of the output voltage is limited to the maximum voltage value.

(A13) The method denoted as (A12) may further include switching operating mode of the switching circuit from the disable operating mode to the reverse current operating mode in response to one or more of (a) magnitude of the output current falling below a first threshold value, and (b) a change in polarity of the output current.

(A14) Either of the methods denoted as (A12) through (A13) may further include varying the maximum voltage value as a function of absolute value of magnitude of the output current, in the reverse current operating mode.

(A15) Either of the methods denoted as (A12) through (A13) may further include varying the maximum voltage value as a hysteretic function of magnitude of the output current, in the reverse current operating mode.

(A14) Either of the methods denoted as (A12) through (A13) may further include allowing the output voltage to track a voltage across the input port, in the reverse current operating mode.

(A17) Any of the methods denoted as (A1) through (A4) may further include: (1) entering a disable operating mode of the switching circuit, and (2) in the disable operating mode: (a) causing the control switching device to continuously operate in its non-conductive state, and (b) causing a freewheeling switching device of the switching circuit to continuously operate in its conductive state, the freewheeling switching device providing a path for output current when the control switching device is operating in its non-conductive state.

(A18) Any of the methods denoted as (A1) through (A17) may further include: (1) determining, at the switching circuit, that the output voltage has reached a first threshold value, and (2) in response to the step of determining, entering the voltage limiting operating mode of the switching circuit.

(B1) A method for controlling a switching circuit including an input port electrically coupled to a photovoltaic device and an output port electrically coupled to a load may include the following steps: (1) in a first operating mode of the switching circuit, causing a control switching device of the switching circuit to repeatedly switch between its conductive and non-conductive states to transfer power from the photovoltaic device to the load, (2) determining, at the switching circuit, that an operating mode change is appropriate, based at least in part on one or more of magnitude of an output current, polarity of the output current, and magnitude of an output voltage, the output voltage being a voltage across the output port, and the output current being a current flowing through the output port, and (3) in response to determining that the operating mode change is appropriate, switching operating mode of the switching circuit from the first operating mode to a second operating mode, the second operating mode being different from the first operating mode.

(B2) In the method denoted as (B1), the second operating mode may be one of (1) a voltage limiting operating mode, where magnitude of the output voltage is limited to a maximum voltage value, (2) a current limiting operating mode, where magnitude of the output current is limited to a maximum current value, and (3) a reverse current operating mode, where magnitude of the output voltage is allowed to rise in response to one or more of (a) magnitude of the output current falling below a first threshold value, and (b) a change in polarity of the output current.

(C1) A method for controlling a switching circuit including an input port electrically coupled to a photovoltaic device and an output port electrically coupled to a load may include the following steps: (1) entering a current limiting operating mode, and (2) in the current limiting operating mode: (a) causing a control switching device of the switching circuit to repeatedly switch between its conductive and non-conductive states in a manner which limits magnitude of an output current to a maximum current value, the output current being a current flowing through the output port, and (b) varying the maximum current value as a function of magnitude of an output voltage, the output voltage being a voltage across the output port.

(C2) The method denoted as (C1) may further include, before the step of the entering the current limiting operating mode, causing the control switching device to repeatedly switch between its conductive and non-conductive states in a manner which maximizes power transferred from the photovoltaic device to the load.

(C3) Either of the methods denoted as (C1) or (C2) may further include varying the maximum current value as a hysteretic function of magnitude of the output voltage, in the current limiting operating mode.

(C4) Either of the methods denoted as (C1) or (C2) may further include temporarily allowing magnitude of the output current to exceed the maximum current value, in the current limiting operating mode.

(C5) The method denoted as (C4) may further include periodically allowing magnitude of the output current to exceed the maximum current value, in the current limiting operating mode.

(C6) Any of the methods denoted as (C1) through (C5) may further include (1) entering a disable operating mode of the switching circuit, and (2) in the disable operating mode: (a) reducing the maximum current value, and (b) causing the control switching device of the switching circuit to repeatedly switch between its conductive and non-conductive states in a manner which limits magnitude of the output current to the maximum current value, to reduce availability of power from the photovoltaic device at the output port.

(C7) The method denoted as (C6) may further include, in the disable operating mode, causing the control switching device to repeatedly switch between its conductive and non-conductive states in a manner which limits magnitude of the output voltage.

(C8) Any of the methods denoted as (C1) through (C5) may further include: (1) entering a disable operating mode of the switching circuit, and (2) in the disable operating mode: (a) causing the control switching device to continuously operate in its non-conductive state, and (b) causing a freewheeling switching device of the switching circuit to continuously operate in its conductive state, the freewheeling switching device providing a path for output current when the control switching device is operating in its non-conductive state.

(C9) Any of the methods denoted as (C1) through (C8) may further include: (1) determining, at the switching circuit, that the output current has reached a first threshold value, and (2) in response to the step of determining, entering the current limiting operating mode of the switching circuit.

(D1) A method for controlling an operating mode control device including an input port electrically coupled to a photovoltaic device and an output port electrically coupled to a load may include the following steps: (1) in a first operating mode of the operating mode control device, transferring power from the photovoltaic device to the load, (2) shunting current flowing through the output port around the photovoltaic device using a switching device electrically coupled across the output port, when an output current exceeds a short circuit current of the photovoltaic device, the output current being current flowing through the output port, (3) switching operating mode of the operating mode control device from the first operating mode to a disable operating mode, and (4) causing the switching device to continuously operate in its conductive state, in the disable operating mode.

(E1) A switching circuit having multiple operating modes may include an input port for electrically coupling to an energy producing device and an output port for electrically coupling to a load, a control switching device electrically coupled between the input port and the output port, and a control module. The control module may include (1) an operating mode submodule configured to enter a voltage limiting operating mode of the switching circuit, (2) a switching control submodule configured to control switching of the control switching device, and (3) a voltage limiting submodule configured to, in the voltage limiting operating mode: (a) command the switching control submodule to cause the control switching device to repeatedly switch between its conductive and non-conductive states in a manner which limits magnitude of the output voltage to a maximum voltage value, the output voltage being a voltage across the output port, and (b) vary the maximum voltage value as a function of magnitude of an output current, the output current being a current flowing through the output port.

(E2) In the switching circuit denoted as (E1), the control module may further include a maximum power point tracking submodule configured to command the switching control submodule to cause the control switching device to repeatedly switch between its conductive and non-conductive states in a manner which maximizes power transferred from the energy producing device to the load.

(E3) In either of the switching circuits denoted as (E1) or (E2), the voltage limiting submodule may be further configured to command the switching control submodule to cause the control switching device to repeatedly switch between its conductive and non-conductive states such that a ratio of change in the output voltage over a change in the output current is a finite value, in the voltage limiting operating mode.

(E4) In either of the switching circuits denoted as (E1) or (E2), the voltage limiting submodule may be further configured vary the maximum voltage value as a hysteretic function of magnitude of the output current, in the voltage limiting operating mode.

(E5) In any of the switching circuits denoted as (E1) through (E4): (1) the operating mode submodule may be further configured to switch operating mode of the switching circuit from the voltage limiting operating mode to a reverse current operating mode, and (2) the control module may further include a reverse current submodule configured to, in the reverse current operating mode: (a) increase the maximum voltage value, and (b) command the switching control submodule to control switching of the control switching device such that magnitude of the output voltage is limited to the maximum voltage value.

(E6) In the switching circuit denoted as (E5), the operating mode submodule may be further configured to switch operating mode of the switching circuit from the voltage limiting operating mode to the reverse current operating mode in response to one or more of (1) magnitude of the output current falling below a first threshold value, and (2) a change in polarity of the output current.

(E7) In either of the switching circuits denoted as (E5) or (E6), the reverse current submodule may be further configured to vary the maximum voltage value as a function of magnitude of the output current, in the reverse current operating mode.

(E8) In either of the switching circuits denoted as (E5) or (E6), the reverse current submodule may be further configured to vary the maximum voltage value as a hysteretic function of magnitude of the output current, in the reverse current operating mode.

(E9) In either of the switching circuits denoted as (E5) or (E6), the reverse current submodule may be further configured such that the output voltage tracks a voltage across the input port, in the reverse current operating mode.

(E10) In any of the switching circuits denoted as (E1) through (E4): (1) the operating mode submodule may be further configured to cause the switching circuit to enter a disable operating mode, and (2) the control module may further include a disable submodule configured to, in the disable operating mode: (a) reduce the maximum voltage value, and (b) command the switching control submodule to cause the control switching device to repeatedly switch between its conductive and non-conductive states in a manner which limits magnitude of the output voltage to the maximum voltage value, to reduce availability of power from the photovoltaic device at the output port.

(E11) In the switching circuit denoted as (E10), the disable submodule may be further configured to, in the disable operating mode, command the switching control submodule to cause the control switching device to repeatedly switch between its conductive and non-conductive states in a manner which limits magnitude of the output current.

(E12) In either of the switching circuits denoted as (E10) or (E11): (1) the operating mode submodule may be further configured to switch operating mode of the switching circuit from the disable operating mode to a reverse current operating mode, and the control module may further include a reverse current submodule configured to, in the reverse current operating mode: (1) increase the maximum voltage value, and (2) command the switching control submodule to control switching of the control switching device, such that magnitude of the output voltage is limited to the maximum voltage value.

(E13) In the switching circuit denoted as (E12), the operating mode submodule may be further configured to switch operating mode of the switching circuit from the disable operating mode to the reverse current operating mode in response to one or more of (1) magnitude of the output current falling below a first threshold value, and (2) a change in polarity of the output current.

(E14) In either of the switching circuits denoted as (E12) or (E13), the reverse current submodule may be further configured to vary the maximum voltage value as a function of magnitude of the output current, in the reverse current operating mode.

(E15) In either of the switching circuits denoted as (E12) or (E13), the reverse current submodule may be further configured to vary the maximum voltage value as a hysteretic function of magnitude of the output current, in the reverse current operating mode.

(E16) In either of the switching circuits denoted as (E12) or (E13), the reverse current submodule may be further configured such that the output voltage tracks a voltage across the input port, in the reverse current operating mode.

(E17) In any of the switching circuits denoted as (E1) through (E4): (1) the operating mode submodule may be further configured to cause the switching circuit to enter a disable operating mode, and (2) the control module may further include a disable submodule configured to, in the disable operating mode: (a) command the switching control submodule to cause the control switching device to continuously operate in its non-conductive state, and (b) command the switching control submodule to cause a freewheeling switching device of the switching circuit to continuously operate in its conductive state, the freewheeling switching device providing a path for output current when the control switching device is operating in its non-conductive state.

(E18) In any of the switching circuits denoted as (E1) through (E17), the operating mode submodule may be further configured to: (1) determine, at the switching circuit, that the output voltage has reached a first threshold value, and (2) in response to the step of determining, enter the voltage limiting operating mode of the switching circuit.

(F1) A switching circuit having multiple operating modes may include an input port for electrically coupling to an energy producing device, an output port for electrically coupling to a load, a control switching device electrically coupled between the input port and the output port, and a control module. The control module may include (1) a switching control submodule configured to control switching of the control switching device such that in a first operating mode of the switching circuit, the control switching device repeatedly switches between its conductive and non-conductive states to transfer power from the energy producing device to the load, and (2) an operating mode submodule configured to: (a) determine, at the switching circuit, that an operating mode change is appropriate, based at least in part on one or more of magnitude of an output current, polarity of the output current, and magnitude of an output voltage, the output voltage being a voltage across the output port, and the output current being a current flowing through the output port, and (b) in in response to determining that the operating mode change is appropriate, switch operating mode of the switching circuit from the first operating mode to a second operating mode, the second operating mode being different from the first operating mode.

(F2) In the switching circuit denoted as (F1), the second operating mode may be one of: (1) a voltage limiting operating mode, where magnitude of the output voltage is limited to a maximum voltage value, (2) a current limiting operating mode, where magnitude of the output current is limited to a maximum current value, or (3) a reverse current operating mode, where magnitude of the output voltage is allowed to rise in response to one or more of (a) magnitude of the output current falling below a first threshold value, and (b) a change in polarity of the output current.

(G1) A switching circuit having multiple operating modes may include an input port for electrically coupling to an energy producing device, an output port for electrically coupling to a load, a control switching device electrically coupled between the input port and the output port, and a control module. The control module may include: (1) an operating mode submodule configured to enter a current limiting operating mode of the switching circuit, (2) a switching control submodule configured to control switching of the control switching device, and (3) a current limiting submodule configured to, in the current limiting operating mode: (a) command the switching control submodule to cause the control switching device to repeatedly switch between its conductive and non-conductive states in a manner which limits magnitude of an output current to a maximum current value, the output current being a current flowing through the output port, and (b) vary the maximum current value as a function of magnitude of an output voltage, the output voltage being a voltage across the output port.

(G2) In the switching circuit denoted as (G1), the control module may further include a maximum power point tracking submodule configured to command the switching control submodule to cause the control switching device to repeatedly switch between its conductive and non-conductive states in a manner which maximizes power transferred from the energy producing device to the load.

(G3) In either of the switching circuits denoted as (G1) or (G2), the current limiting submodule may be further configured to vary the maximum current value as a hysteretic function of magnitude of the output voltage, in the current limiting operating mode.

(G4) In any of the switching circuits denoted as (G1) through (G3), the current limiting submodule may be further configured to temporarily allow magnitude of the output current to exceed the maximum current value, in the current limiting operating mode.

(G5) In the switching circuit denoted as (G4), the current limiting submodule may be further configured to periodically allow magnitude of the output current to exceed the maximum current value, in the current limiting operating mode.

(G6) In any of the switching circuits denoted as (G1) through (G5): (1) the operating mode submodule may be further configured to cause the switching circuit to enter a disable operating mode, and (2) the control module may further include a disable submodule configured to, in the disable operating mode: (a) reduce the maximum current value, and (b) command the switching control submodule to cause the control switching device to repeatedly switch between its conductive and non-conductive states in a manner which limits magnitude of the output current to the maximum current value, to reduce availability of power from the photovoltaic device at the output port.

(G7) In the switching circuit denoted as (G6): the disable submodule may be further configured to, in the disable operating mode, command the switching control submodule to cause the control switching device to repeatedly switch between its conductive and non-conductive states in a manner which limits magnitude of the output voltage.

(G8) In any of the switching circuits denoted as (G1) through (G5): (1) the operating mode submodule may be further configured to cause the switching circuit to enter a disable operating mode, and (2) the control module may further include a disable submodule configured to, in the disable operating mode: (a) command the switching control submodule to cause the control switching device to continuously operate in its non-conductive state, and (b) command the switching control submodule to cause a freewheeling switching device of the switching circuit to continuously operate in its conductive state, the freewheeling switching device providing a path for output current when the control switching device is operating in its non-conductive state.

(G9) In any of the switching circuits denoted as (G1) through (G8), the operating mode submodule may be further configured to: (1) determine, at the switching circuit, that the output current has reached a first threshold value, and (2) in response to the step of determining, enter the current limiting operating mode of the switching circuit.

(H1) An electric power system may include: (1) at least one of the switching circuits denoted as E1-E18, F1, F2, and G1-G8, and (2) a respective energy producing device electrically coupled to the input port of each of the at least one switching circuit.

(H2) In the electric power system denoted as (H1), each energy producing device may be a photovoltaic device.

(H3) In either of the electric power systems denoted as (H1) or (H2), the at least one of the switching circuits may include a plurality of the switching circuits denoted as E1-E18, F1, F2, and G1-G8, and output ports of at least two of the plurality of switching circuits may be electrically coupled in series.

(I1) An operating mode control device may include: (1) an input port for electrically coupling to a photovoltaic device and an output port for electrically coupling to a load, (2) a switching device electrically coupled across the output port, and (3) a control module configured to: (a) cause the switching device to operate in its conductive state to shunt current flowing through the output port around the photovoltaic device, when an output current exceeds a short circuit current of photovoltaic device, the output current being current flowing through the output port, (b) cause the operating mode control device to enter a disable operating mode, and (c) cause the switching device to continuously operate in its conductive state, in the disable operating mode.

What is claimed is:

1. A method of controlling switching circuits to change from a maximum power point tracking (MPPT) mode to a voltage limiting operating mode, wherein a plurality of switching circuits are electrically coupled in strings of at least two switching circuits in series, with at least two strings electrically coupled in parallel, each switching circuit including an input port electrically coupled to a photovoltaic device and an output port electrically coupled to a load, each switching circuit performing the method comprising:

operating each switching circuit in a MPPT mode by causing a control switching device to repeatedly switch between its conductive and non-conductive states in a manner which maximizes power transferred from the photovoltaic device to the load;

continuously sensing output current flowing through the output port;

entering a voltage limiting operating mode in response to sensing a magnitude of the output current falling below a threshold value, and in the voltage limiting operating mode:
causing the control switching device of the switching circuit to repeatedly switch between its conductive and non-conductive states to limit a magnitude of an output voltage, across the output port, to less than or equal to a maximum voltage value, and
varying the maximum voltage value based on the output current.

2. The method of claim 1, further comprising, in the voltage limiting operating mode, causing the control switching device to repeatedly switch between its conductive and non-conductive states such that a ratio of change in the output voltage over a change in the output current is finite.

3. The method of claim 1, further comprising, in the voltage limiting operating mode, varying the maximum voltage value as a hysteretic function of hysteretically with respect to a magnitude of the output current.

4. The method of claim 1, further comprising:
entering a disable operating mode of the switching circuit; and
in the disable operating mode:
reducing the maximum voltage value, and
causing the control switching device to repeatedly switch between its conductive and non-conductive states in a manner which limits magnitude of the output voltage to the maximum voltage value, to reduce availability of power from the photovoltaic device at the output port.

5. The method of claim 4, further comprising, in the disable operating mode:
reducing a maximum current value specifying a maximum magnitude of the output current; and
causing the control switching device to repeatedly switch between its conductive and non-conductive states in a manner which limits magnitude of the output current to the maximum current value, to reduce availability of power from the photovoltaic device at the output port.

6. The method of claim 1, further comprising:
entering a disable operating mode of the switching circuit; and
in the disable operating mode:
causing the control switching device to continuously operate in its non-conductive state, and
causing a freewheeling switching device of the switching circuit to continuously operate in its conductive state, the freewheeling switching device providing a path for output current when the control switching device is operating in its non-conductive state.

7. The method of claim 1, further comprising:
determining, at the switching circuit, that the output voltage has reached a first threshold value; and
in response to the step of determining, entering the voltage limiting operating mode of the switching circuit.

* * * * *